(12) United States Patent
Colecchia

(10) Patent No.: US 7,647,335 B1
(45) Date of Patent: Jan. 12, 2010

(54) COMPUTING SYSTEM AND METHODS FOR DISTRIBUTED GENERATION AND STORAGE OF COMPLEX RELATIONAL DATA

(75) Inventor: Federico Colecchia, Cerea (IT)

(73) Assignee: ATA SpA - Advanced Technology Assessment, Milan (IT)

( * ) Notice: Subject to any disclaimer, the term of this patent is extended or adjusted under 35 U.S.C. 154(b) by 269 days.

(21) Appl. No.: 11/216,243

(22) Filed: Aug. 30, 2005

(51) Int. Cl.
 *G06F 17/30* (2006.01)

(52) U.S. Cl. .............................. 707/102; 707/1; 707/3; 707/10; 707/100; 707/101

(58) Field of Classification Search .................. 707/1, 707/3, 10, 100, 101, 102, 103 X
See application file for complete search history.

(56) References Cited

U.S. PATENT DOCUMENTS

| | | | | |
|---|---|---|---|---|
| 5,313,571 A | 5/1994 | Hirose et al. | ................ | 395/140 |
| 5,611,035 A | 3/1997 | Hall | .......................... | 395/140 |
| 5,638,501 A | 6/1997 | Gough et al. | ............... | 395/135 |
| 5,754,186 A | 5/1998 | Tam et al. | .................... | 345/435 |
| 5,949,432 A | 9/1999 | Gough et al. | ............... | 345/435 |
| 5,995,114 A | 11/1999 | Wegman et al. | ............. | 345/440 |
| 6,211,887 B1 | 4/2001 | Meier et al. | ................. | 345/440 |
| 6,671,686 B2 * | 12/2003 | Pardon et al. | .................. | 707/8 |
| 6,867,788 B1 | 3/2005 | Takeda | ....................... | 345/630 |
| 6,909,695 B2 | 6/2005 | Lee et al. | .................... | 370/238 |
| 6,910,053 B1 | 6/2005 | Pauly et al. | ................. | 707/203 |
| 6,912,196 B1 | 6/2005 | Mahalingaiah | .............. | 370/216 |
| 6,912,229 B1 | 6/2005 | Lauro et al. | ................. | 370/465 |
| 6,912,535 B2 | 6/2005 | Mao | ............................ | 707/10 |
| 6,912,536 B1 | 6/2005 | Ochitani | ...................... | 707/100 |
| 6,912,588 B1 | 6/2005 | Jardin et al. | ................. | 709/238 |
| 6,912,607 B2 | 6/2005 | Smith et al. | .................. | 710/100 |
| 2001/0034795 A1 | 10/2001 | Moulton et al. | ............. | 709/244 |
| 2001/0051955 A1 | 12/2001 | Wong | ......................... | 707/201 |
| 2002/0184451 A1 | 12/2002 | Dovi | ........................... | 711/148 |

(Continued)

OTHER PUBLICATIONS

Chen et al., "*The Rising Landscape: A Visual Exploration of Superstring Revolutions in Physics*", Journal of the American Society for Information Science and Technology, 54(5), pp. 435-446 (Mar. 2003).

(Continued)

*Primary Examiner*—Cam-Linh Nguyen
(74) *Attorney, Agent, or Firm*—McDonnell Boehnen Hulbert & Berghoff LLP

(57) ABSTRACT

A system is disclosed for distributed generation and storage of relational data which can be represented as a network or sub-network. The system includes a plurality of distributed computing nodes (e.g., general purpose computers) configured with software for generating and storing relational data from input individual records. The system further includes a decentralized management subsystem for distribution of input records to the distributed computing nodes for processing (i.e., generation and storage of the relational data) and for providing access to the relational data to a user. The management subsystem includes a) a network management system process providing for dispatching input records to the nodes, b) an optimization process for optimizing the dispatch of input records to the nodes, c) an indexing process for indexing of records dispatched to the nodes and relational data generated at the nodes; and d) a query management process for responding to user queries and providing transparent access to the relational data.

21 Claims, 13 Drawing Sheets

U.S. PATENT DOCUMENTS

| | | | |
|---|---|---|---|
| 2003/0050924 A1 | 3/2003 | Faybishenko et al. | 707/3 |
| 2003/0088544 A1 | 5/2003 | Kan et al. | 707/3 |
| 2003/0120672 A1 | 6/2003 | Bingham | 707/100 |
| 2003/0140051 A1 | 7/2003 | Fujiwara et al. | 707/100 |
| 2003/0220960 A1 | 11/2003 | Demoff et al. | 709/104 |
| 2003/0225884 A1 | 12/2003 | Hayden | 709/226 |
| 2004/0078466 A1 | 4/2004 | Coates et al. | 709/226 |
| 2004/0088297 A1 | 5/2004 | Coates et al. | 707/10 |
| 2004/0215764 A1* | 10/2004 | Allen et al. | 709/224 |
| 2005/0010618 A1 | 1/2005 | Hayden | 707/204 |
| 2005/0120137 A1 | 6/2005 | Moulton et al. | 709/244 |
| 2006/0168154 A1* | 7/2006 | Zhang et al. | 709/220 |

OTHER PUBLICATIONS

Chaomei Chen, "*The Centrality of Pivotal Points in the Evolution of Scientific Networks*", (*IUI'05*) (Jan. 9-12, 2005) ( San Diego, California), ACM Press 1-58113-894-6/05/0001, pp. 98-105 (2005).

Chaomei Chen, "*Searching for intellectual turning points: Progressive knowledge domain visualization*", PNAS vol. 101, suppl. 1, pp. 5303-5310 (Apr. 6, 2004).

Haas et al., *DiscoveryLink: A system for integrated access to life sciences data sources*, IBM Systems Journal, vol. 40, No. 2, pp. 489-511 (2001).

Chen et al. *Visualizing a Knowledge Domain's Intellectual Structure* IEEE 0018-9162/01 Research Feature, pp. 65-71, (Mar. 2001).

Chen et al., "*Trailblazing the Literature of Hypertext: Author Co-Citation Analysis (1989-1998)*", Proceeding of the 10th ACM Conference on Hypertext and hyper-media (1999).

Chaomei Chen, "*Visualising Semantic Spaces and Author Co-Citation Networks in Digital Libraries*", Information Processing and Management 35, pp. 401-420 (pre-print version) (1999).

\* cited by examiner

COMPUTING SYSTEM AND METHODS FOR DISTRIBUTED GENERATION AND STORAGE OF COMPLEX RELATIONAL DATA

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

This invention relates generally to the fields of knowledge visualization, peer-to-peer networking, and data mining and information extraction. More particularly, this invention relates to a computing system, and associated methods, for generating and storing complex relational data capable of being represented as a network, from an input set of data ("records" herein) in a distributed manner. Aspects of the system also provide methods for providing a user with persistent access to the relational data in a distributed computing environment.

Knowledge visualization is a field of endeavor that is devoted to developing tools and techniques for graphically representing information in order to assist a human in having a deeper insight into patterns or relationships that exist within the information. Knowledge visualization is applicable in a variety of disciplines in the sciences and business world. The information, which may consist of relational data, may be represented graphically in the form a "network" or "sub-network".

Attention is directed to FIG. 1 for an example of knowledge visualization of relational data in the form of a network. FIG. 1 is a representation of relational data in the form of a collection of sub-networks 10. In the example of FIG. 1, the input records consist of publications. The vertices 12, 14 in the sub-networks 10 comprise keywords (annotations) such as "enzyme inhibitor" 14A and "inflammation" 14B associated with input records. Different shapes for the vertices 12, 14 correspond to different categories those keywords belong to in the context of a given taxonomy. In this particular example, squares and triangles correspond to diseases and general biomedical entities, respectively. The links (lines) 16 joining the triangular vertices to the squares indicate that those particular keywords are contained in at least one common publication.

Knowledge visualization of relational data such as shown in FIG. 1 is an analytical tool for obtaining greater insight into patterns or relationships present in the input records. For example, if the researcher wanted to ascertain which keywords co-occur in the analyzed set of publications, they would consult the set of links in the graph; an external dedicated graph visualization module used in conjunction with this system might also support features allowing interactive access to micro-level information associated with individual records that establish specific relations in the network, which are visually rendered as links in the corresponding graph. Other examples might correspond to inhomogeneous networks where vertices correspond to keywords (authors) or publications; a link between a keyword (author) and a publication would correspond to that publication mentioning the keyword (being published by that author), while intra-keyword (-author) links would still correspond to co-occurrence (co-authorship). Details about specific meaning of vertices and links in the graph are not important and can vary widely in this invention.

FIG. 2 is another example of relational data in the form of a collection of sub-networks 10. In the example of FIG. 2, a new input record 18 consist of a publication; the vertices 20 in the sub-network 10 comprise authors of publications. Lines 16 joining vertices indicate that two publications share a common author. The input record 18 is mapped to the sub-network by constructing additional lines as needed to show the relatedness among the authors of the input record 18, some of which could possibly already be part of sub-networks 10. The greater the number of links a given author has to other authors, the larger the vertex. Hence, the largest vertices could be considered to be leading or prominent authors.

Knowledge visualization is described further in the following references, the contents of which are incorporated by reference herein: Chen C., "The centrality of pivotal points in the evolution of scientific networks", Int'l Conf. on Intelligent User Interfaces (IUI 2005), San Diego, Calif. Jan. 9-12, 2005; Chen C., "Searching for intellectual turning points: Progressive Knowledge Domain Visualization", Proceedings of the National Academy of Sciences of the United States of America (2004); Chen C., Kuljis J., "The rising landscape: a visual exploration of superstring revolutions in physics", Journal of the American Society for Information Science and Technology, 54, 5, 435-446 (2003); Chen C., Paul, R. J., "Visualizing a knowledge domain's intellectual structure", IEEE Computer, 34(3), 65-71 (2001); Haas L. M., "DiscoveryLink: a system for integrated access to life sciences data sources", IBM Systems Journal, 40, 2, 489-511 (2001); Chen C., "Visualising Semantic Spaces and Author Co-Citation Networks in Digital Libraries", Information Processing & Management, 35(3), 401-420 (1999); Chen C., Carr L., "Trailblazing the Literature of Hypertext: Author Co-Citation Analysis", Proceedings of the 10th ACM Conference on Hypertext and Hypermedia (1999). ISSI 2005—10th International Conference of the International Society for Scientometrics and Informetrics. Jul. 24-28, 2005, Stockholm, Sweden.

The patent literature includes several references devoted to graphical visualization techniques, including U.S. Pat. Nos. 5,313,571; 6,211,887; 5,611,035; 5,638,501; 5,949,432; 5,754,186 and 6,867,788.

The following recently issued U.S. Patents are of potential interest to aspects of the present inventive system, as either being directed to methods and systems for presenting information, or in the context of client/server systems in distributed computing environments, or in the context of distributed databases: U.S. Pat. Nos. 6,912,536; 6,912,607; 6,912,229; 6,910,053; 6,909,695, 6,912,588, 6,912,535 and 6,912,196.

Several U.S. patent publications are of interest to various aspects of the present disclosure, including 2005/0120137; 2005/0010618; 2004/0078466; 2004/0088297; 2003/0120672; 2003/0140051; 2003/0220960; 2003/0225884; 2003/0088544; 2003/0050924; 2002/0184451; 2001/0034795 and 2001/0051955. Of these references, U.S. patent publications 2004/0078466 and 2002/0184451 are in some ways the most relevant to the present system.

SUMMARY

The following embodiments and aspects thereof are described and illustrated in conjunction with systems, tools and methods which are meant to be exemplary and illustrative, not limiting in scope.

In a first aspect, a system is disclosed for distributed generation and storage of relational data which can be represented as a network or sub-network. The system includes a plurality of distributed computing nodes (e.g., general purpose computers) configured with software for generating and storing relational data from input individual records. The nodes may exist on a single network (e.g., local area network) or, alternatively may be distributed over a geographic area and be connected to wide area packet switched network such as a corporate backbone network or the Internet. In some embodiments, all of the nodes could be managed and maintained by a single entity (e.g., corporation, research institute, governmental agency, etc.) and in other embodiments the computing nodes could be managed and maintained by different organizations but configured and used for a common purpose of distributed generation and storage of relational data.

The system further includes a decentralized software and hardware management subsystem for distribution of input records to the distributed computing nodes for processing (generation and storage of the relational data) and for providing access to the relational data to a user. The decentralized software and hardware management subsystem takes the form of one or more computing platforms (e.g., general purpose computers with central processing unit and memory storing software instructions) that implement the following individual processes:

a) a network management system process providing for coordinating dispatching input records or information associated therewith to the distributed computing nodes, b) an optimization process for optimizing the dispatch of input records or information associated therewith to the nodes, c) an indexing process for indexing of records dispatched to the nodes or otherwise available to the nodes and relational data generated at the nodes, processing local indexing data into overall indexes, and providing the overall indexes to the optimization process or other processes in the decentralized software and hardware management subsystem as needed; and d) a query management process for responding to user queries and providing transparent access to the relational data.

The computing platforms performing these processes may also function as distributed computing nodes generating and storing relational data from the input records.

In preferred embodiments, there are no central computing platforms responsible for running the above processes; rather, each of these processes runs at a particular computing platform (e.g., node) at a given time, according to a suitable optimization procedure. The computing platform may execute other processes besides those related to distributed generation and storage of relational data, such as user authentication, web server, system administration, or other. Preferably, these processes, and logs of activity associated with each process, can be transferred to different computing platforms when required, according to optimization criteria taking resources into account. The system is thus characterized by a sizable degree of robustness, and each process can be transferred from one platform to another without breaking the overall computational flow, or leading to incomplete or inconsistent log or status information. However, an instance of each of the above processes will be running at some computing platform at any given time. This can be achieved by means of a process transfer procedure that is described below, data mirroring and/or suitable local redundancies.

The system is useful in a variety of environments wherein data management and analysis of large sets of relational data capable of being represented as a network or sub-network is desired by an entity or institution. Applications of the system include the physical and social sciences and medicine (wherein the input records could be publications or portions thereof), information technology, pharmacology and drug discovery, integrated circuit design, corporate strategy wherein an entity seeks to obtain a deeper understanding of business relationships, customers or sales, security, and still others. Consequently, the nature of the input records is not particularly important and could be for example, data as to chemical structures, VLSI integrated circuit chip designs, publication or portions thereof (e.g., scientific papers, conference proceedings, journals or journal articles, etc.), or business data. The input records may contain relational data as well as non-relational data. The relational data could comprise, for example, annotations (which may be input by a user or operator), such as for example the names of the authors of the papers, keywords appearing in the articles, properties (e.g., mass) or biological effects of chemical structures, etc. Annotations or other relational data could also be obtained from automated or semi-automated extraction, indexing, or classification procedures applied to the input records. The non-relational data in the input records may take a variety of forms, such as text, chemical structures or formulae, circuit diagrams, etc.

The individual elements of the decentralized management subsystem are also innovative and useful in a system for distributed generation and storage of relational data at distributed computing nodes from input records. Thus, in a further aspect, a computing platform providing a network management process is disclosed comprising a central processing unit and a machine-readable storage medium containing a set of instructions for execution by the processing unit. The instructions comprises one or more software modules for performing the following functions: (i) receiving a set of input records; (ii) querying a dispatch optimization process and responsively receiving information as to an optimized grouping for dispatching of the set of input records to the distributed computing nodes; and (iii) coordinating the dispatching the input records to the distributed computing nodes in an optimized manner for processing of the input records and generation and storage of the relational data.

In preferred embodiments, the instructions further comprise instructions creating a log of activity relating to the functional behavior of the network management system processes. The instructions further include instructions for dynamically transferring execution of the process to a second computing platform. The second computing platform assumes execution of the network management system function and obtains the log from the transferring computing platform or from another source (e.g., using data mirroring techniques).

In still another aspect, a computing platform is disclosed providing a dispatch optimization process for a system providing for distributed generation and storage of relational data at distributed computing nodes from input records. The computing platform includes a central processing unit and a machine-readable storage medium containing a set of instructions for execution by the processing unit. The instructions include one or more modules for performing the following functions: (i) determining processing resources available to the distributed computing nodes, (ii) determining any pre-existing availability of input records or portions thereof at the individual computing nodes or storage devices accessible thereto, and (iii) in response to information as to an input set of records, using functions (i) and (ii) and additional customizable optimization criteria, to create a schedule for optimized distribution of the input records to the distributed computing nodes. The instructions further provide the function of providing the optimization schedule to a network management process to use in coordinating the distribution of the input records to the distributed computing nodes.

As with the case of the computing platform implementing the network management process, the instructions preferably further comprise instructions creating a log of activity relating to the functional behavior of the dispatch optimization process and providing the ability to dynamically transfer the process to another computing platform equipped with the same software modules.

In still another aspect, a computing platform is disclosed providing an indexing process for a system providing for distributed generation and storage of indexes of relational data and other type of information in source input records at the distributed computing nodes. The platform includes a central processing unit and a machine-readable storage medium containing a set of instructions for execution by the processing unit, the instructions providing for the functions of: (i) retrieving an index of the input records and relational data stored at individual computing nodes and resolving any inconsistencies in such index; and (ii) providing validated index information to a dispatch optimization process optimizing the dispatch of input records to the distributed computing nodes for generation and storage of relational data.

The platform also preferably includes instructions creating a log of activity relating to the functional behavior of the indexing process and dynamically transferring the dynamic execution of the instructions to a different computing platform.

In still a further embodiment, a computing platform is disclosed providing a query management process for a system providing for distributed generation and storage of relational data at distributed computing nodes from input records. The computing platform comprises a central processing unit and a machine-readable storage medium containing a set of instructions for execution by the processing unit. The instructions provide for the functions of (i) receiving user query of the system; (ii) checking an index of distributed relational data and associated distributed computing nodes storing the distributed relational data to determine distributed computing nodes storing relational data responsive to the user query, (iii) retrieving relational data or other type of data from the distributed computing nodes responsive to the user query, and (iv) providing the relational data or other type of data to the user, either directly or indirectly, e.g., via the user's terminal or any intervening computing or routing devices. In one example embodiment, the users can access the relational data and corresponding visual representations in the form of graphs by means of auxiliary visualization modules. As the index may also includes data on the location of source data (input records), portions of the original source data can be linked from the graphs themselves for user access, for example, Abstracts and full text of source publications.

The situation may frequently arise where, in response to a user query, relational data from multiple distributed computing nodes may be retrieved. The query management system may include additional instructions for merging the relational data and creating a "network" representation from multiple sub-networks. The query management system may be provided with a tool or plug-in module for visualization of the sub-networks or merged "network." The visualization may provide the relational data to the user in the form of a graph illustrating the relational data, e.g., of the form shown in FIGS. 1 and 2 or as described in the prior art literature.

As with the case of the network management, optimization, and indexing processes, the query management process may also be dynamically transferred to another computing platform. The query management process preferably includes instructions generating a log of activity relating to the functional activity of the query management process and such log can be transferred to the new computing platform or otherwise obtained using data mirroring techniques.

In another aspect, a method is provided for distributed generation and storage of relational data which can be represented as a network or sub-network. The method includes the steps of (a) receiving a collection of individual input records, (b) distributing the records to a plurality of individual, distributed computing nodes, (c) at the individual computing nodes, generating relational data from the records which can be represented as networks or sub-networks and storing the relational data locally, and (d) creating an index of the relational data or other type of data stored at individual computing nodes to facilitate access to the data in response to a user query. In accordance with this method, the relational data for a set of multiple individual input records is generated and stored across a plurality of individual computing nodes.

In addition to the exemplary aspects and embodiments described above, further aspects and embodiments will become apparent by reference to the drawings and by study of the following detailed descriptions.

BRIEF DESCRIPTION OF THE DRAWINGS

Representative embodiments are illustrated in appended drawings figures. It is intended that the embodiments and figures disclosed herein are to be considered illustrative rather than restrictive.

DETAILED DESCRIPTION OF REPRESENTATIVE EMBODIMENTS

System Overview

Figure 1:
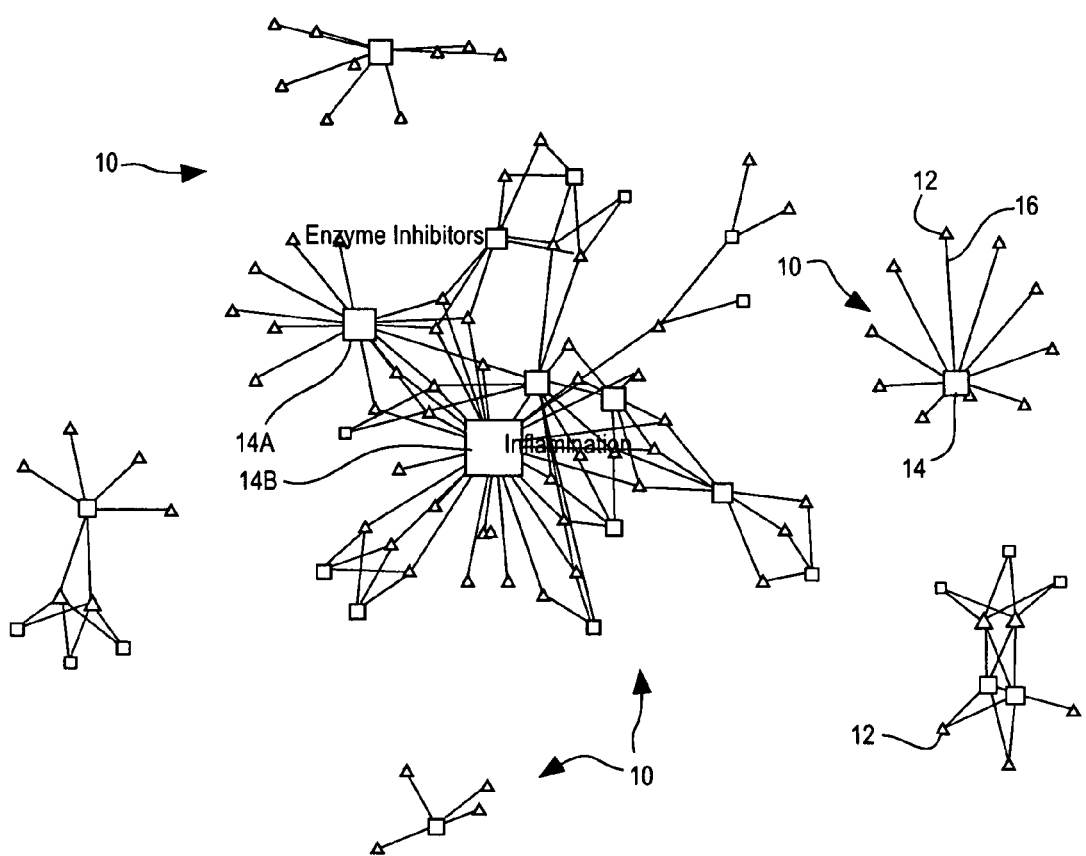
FIG. 1 is a representation of relational data in the form of a collection of sub-networks. In the example of FIG. 1, the input records consist of publications, the vertices in the sub-networks are keywords (annotations), such as "enzyme inhibitor" and "inflammation" associated with the input records. The links (lines) joining vertices indicate that the keywords are found in at least one common publication. Knowledge visualization of relational data such as shown in FIG. 1 is an analytical tool for obtaining greater insight into patterns and relationships in the input records.
Figure 2:
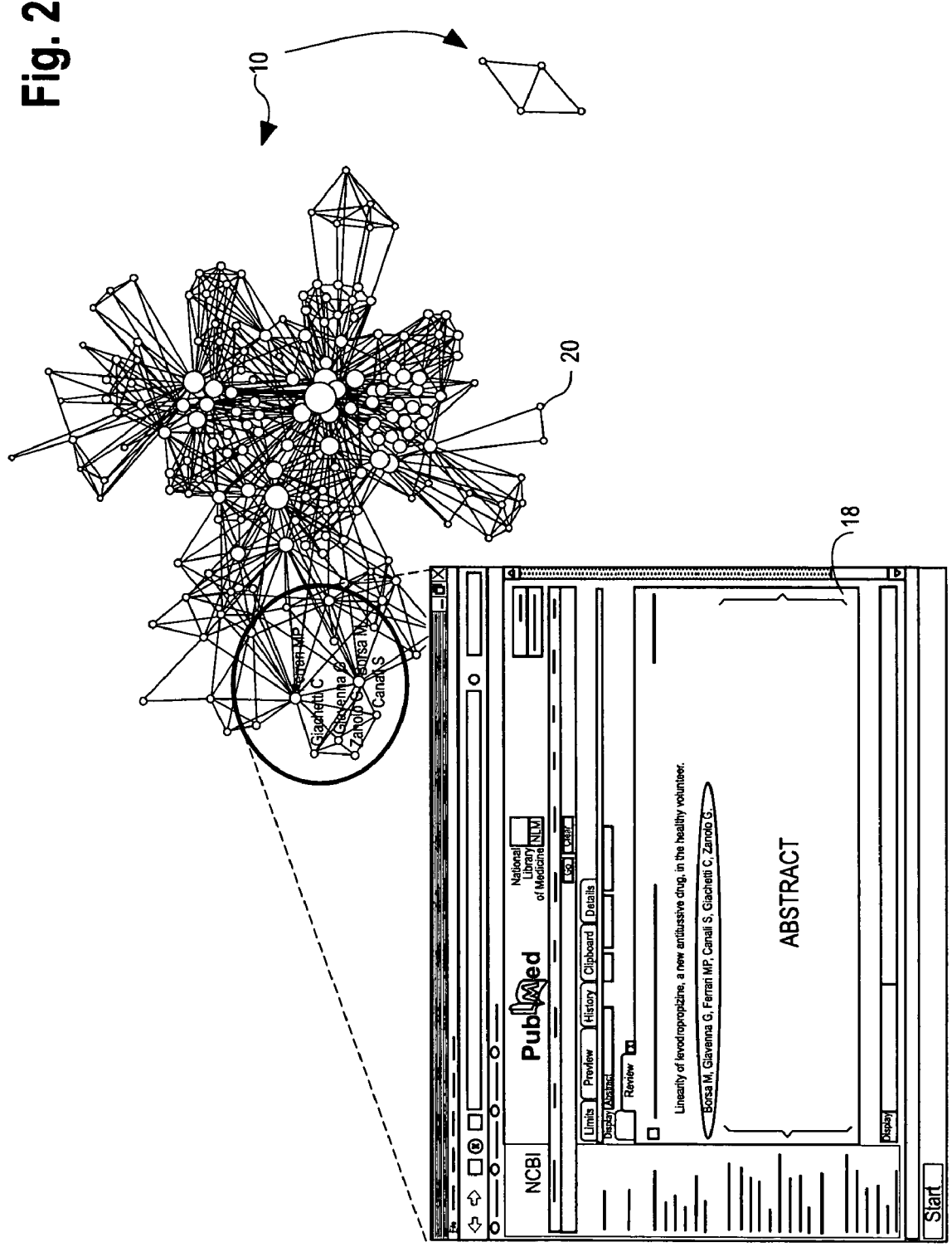
FIG. 2 is another example of relational data in the form of a collection of sub-networks. In the example of FIG. 2, the input records consist of a publication, the vertices in the sub-network comprise authors of publications. Lines joining vertices indicate that two authors share at least one common publication.

The present disclosure relates to a distributed computing system and method for generation and storage of relational data which can be represented as complex networks or sub-networks, for example as shown in FIGS. 1 and 2. In this disclosure, the terms "networks" and "sub-networks" are used to refer to relational data and associated data structures created from input records (such as shown in FIGS. 1 and 2), and not to the interconnections or computer networking infrastructure between the distributed computing nodes creating such relational data, unless the context clearly indicates otherwise. The term "graph" is used here to describe a visual presentation of complex networks or sub-networks, examples of which are shown in FIGS. 1 and 2. Graphical visualization tools are external software and hardware modules that can be used by a query response system or the user's computer to visualize such relational data or data structures.

The distributed computing system has several features, one of which is de-localization (distribution) of the process for generating the relational data, storage of the relational data, and providing data for response to a user query from one or more of the computing nodes. The system further allows for transparently access to the data from any computer connected to the distributed system, which optimizes access to local source data repositories, and leads to a high level of robustness.

The features of this system are made possible by a core relational data (i.e., network or sub-network) generation process described below. The process is both linear and incremental, which allows one to easily add or remove input records to the processed data, and obtain updated relational data structures in a flexible manner. In general, this architecture makes it possible to exploit different hardware and software computing resources located within a local area network (LAN), or computing resources at physically distinct sites. By virtue of the virtually unlimited expandability and flexibility of the distributed computing architecture, one can build arbitrarily complex networks (relational data structures) from any arbitrarily large set of input records. For example, in an example of input records comprising publications or portions thereof (such as scientific journal articles, conference proceedings and the like), one can access huge distributed repositories of such publications, distribute them as input records in an optimized manner to a plurality of distributed computing nodes, and generate complex relational data structures (networks or sub-networks) relating keywords or authors or other relevant attributes of the input records and thereby generate data structures in a very flexible and extensible manner.

In general, the burden related to local data storage management and local computing power is thus mitigated by the use of computing resources available at different locations. Each computing node at each individual site contributes to the overall process of network generation, storage, query response and access according to an optimized de-centralized task planning.

The system that is disclosed here implements a distributed, de-localized solution for complex network (relational data) generation, query and answer, and relational data storage, and allows to concurrently exploit computing resources available within a LAN or a wider computer network comprising computing resources at geographically distant locations. Both management level processes (distribution of records, indexing, optimization of records distribution, and query response) and processing of input records and generation of complex networks and sub-networks are preferably de-centralized. The distributed computing system uses a peer-to-peer like architecture for inter-computing platform communications. Further, dynamic transfer of management level processes to backup computing platforms is also preferably provided, which leads to a significant level of robustness of the overall system with respect to hardware or software failures.

The following example details one specific embodiment with respect to a particular application of interest to similarity networks from scientific publications in the field of the Life Sciences. The present example is offered by way of illustration and not limitation. Persons skilled in the art will appreciate that the disclosure is applicable to other fields, including those described previously or discussed in the cited prior art, such as for example complex business relationship data, pharmaceutical science and drug discovery, VLSI circuit design, and others. A few major reasons of interest of the present invention to the domain of publications are, firstly, the development of a de-localized and de-centralized optimized architecture to handle distributed source input records (scientific publications, conference proceedings, etc.). In particular, the system can obtain input records from a variety of distributed sources, including sources (libraries) available over a computer network such as the Internet. Secondly, the use of the present system to generate networks representing bibliometric analyses (concept or keyword similarity, co-citation studies, co-authorship studies, etc.) has powerful applications in the life and physical sciences.

Consider the list of major centers, organizations, and conferences relevant to the Life Sciences set forth in Table 1 below. Input records in the form of publications or portions thereof (scientific publications, conference proceeding, etc.) in electronic form is available from these centers and organizations over a computer network such as the Internet. The list below is given as an example only, and is far from being exhaustive. The present example assumes all input records to be remotely accessible in electronic format.

TABLE 1

Major centers, organizations, and conferences of interest to the Life Sciences worldwide (cont'd)

| Organization/conference | Focus | Web site |
| --- | --- | --- |
| European Molecular Biology Organization (EMBO) | Molecular Biology | http://www.embl.org/ |
| European Bioinformatic Institute | Bioinformatics | http://www.ebi.ac.uk/ |
| Swiss Institute of Bioinformatics (SIB) | Bioinformatics | http://www.isb-sib.ch/ |
| The Wellcome Trust Sanger Institute | Genomics | http://www.sanger.ac.uk/ |
| The National Human Genome Research Institute (NHGRI) | Genomics | http://www.genome.gov/ |
| The Scripps Research Institute (TSRI) | Basic biomedical science | http://www.scripps.edu/ |
| Cold Spring Harbour Laboratory (CSHL) | Oncology, Neurobiology, Plant Genetics, Genomics, and Bioinformatics | http://www.cshl.org/ |
| Columbia University Medical Center | Genomics | http://www.cumc.columbia.edu/ |
| The Harvard-MIT Division of Health Sciences and Technology (HST) | Bioinformatics and Integrative Genomics | http://big.chip.org/ |
| Harvard Institute of Proteomics | Proteomics | http://www.hip.harvard.edu/ |
| Institute for Genomics and Bioinformatics (IGB) | Genomics, Proteomics, Computational Biology | http://www.igb.uci.edu/ |
| Istituto Scientifico Universitario San Raffaele | Molecular Medicine | http://www.fondazionesanraffaele.it/ |
| The Gordon Research Conferences | International forum for the presentation and discussion of frontier research in the biological, chemical, and physical sciences, and their related technologies | http://www.grc.uri.edu/ |
| ESF-EMBO Symposia | ESF/EMBO Symposia bring together participants and experts from the Life Sciences and other related science disciplines to discuss topics that are of major importance to the scientific community in Europe | http://www.esf.org/ |

It is preferable that each record is annotated, i.e., associated with normalized keywords or other entities relevant to the analyses of interest. Annotation could be performed by a trained operator or by an automated process. In other contexts, the input records could have other types of relational data associated with the records besides annotations.

The input records from such centers/organizations/conferences are processed in distributed computing nodes as described herein to generate complex networks. The computing resources could be organized and operated by such centers or organizations, or they could be organized and operated by a different single entity, such as for example an individual member of such group of centers and organizations, a pharmaceutical or medical company, research institute, or other entity. The nature of the ownership and management of such computing nodes is not particularly important. Each one of these distributed computing resources is referred to as a "node" in the present distributed computing system, and such term is also encompassing of the resources' local and shared data storage resources. The nodes may be general purpose computers, network servers, or any other type of computing platform, the details of which are not important.

In this sample application, the purpose of the system is to generate relational data capable of representation as similarity networks or other networks obtained from source data in the form of input records comprising publication abstracts or full texts. Such networks can take the form of concept similarities, co-authorships, co-citations, citation, or other type. The system further provides for transparent access to the shared data across available sites, build the desired networks, and store them in an optimized distributed system. The query response element of the system can work with this distributed, de-localized network as if the resulting network (aggregate of sub-networks) or the sub-networks themselves were locally stored.

While the system of this invention is capable of being distributed across institutions or entities, for example in a scenario where the computing nodes were located at the above institutions, the scenario where all of the nodes are operated by the same entity can actually be considered to be one of the easiest implementations of this system and perhaps a more common one.

Suppose a single institution owns rich electronic datasets of scientific publications, which makes it possible to perform a full bibliometric analysis (such as a co-authorship analysis in order to point analysts to interesting relational patterns in a given field of interest).

All of the nodes in the proposed system would be operated at that institution (and its subsidiaries if applicable), and all of the records in the source database would be processed in order to generate the requested network representations. No processing would be required outside of the organization in this case.

The system allows optimization of the overall process by assigning bunches of records to different nodes for processing, which can achieve at least two goals:

1. speed up network generation by exploiting multiple hardware and software resources; and
2. generate intermediate, incomplete sub-networks on-the-fly.

For example, suppose a network of co-authorships on oncology is needed at a certain organization. This solution allows using individual nodes at that organization to generate sub-networks on specific domains that can be of interest by themselves; for example, lung neoplasm-related publications could be assigned to one node i processing, lymphoma-related conference proceedings could be processed by nodes j and k, and so on. At the end of the process, all of the sub-networks could be merged into an overall representation. An advantage of this approach is the following: incomplete but potentially informative intermediate representations will be available to analysts (in some cases almost on-the-fly, as processing times could be significantly smaller corresponding to specific sub-domains) for preliminary investigation even before the complete picture is ready. Individual departments at that organization could thus address specific issues relevant to sub-domains they are responsible for before the outcome of the complete analysis is ready. Moreover, this would not be ad-hoc processing, it would rather be part of the whole analysis, and the corresponding outcome would be one of the building blocks of the overall network.

In general, this can lead to promptly identify more effective research strategies, without losing time (both machine and human) developing analyses based on sub-optimal approaches. In principle, inspection of intermediate results could even trigger adjustments to queries, and guide analysts' mining processes by suggesting changes to their strategy. For instance, users might have adopted a given approach to select relevant documents first, but a preliminary analysis of intermediate sub-networks could actually point them to a more effective approach; analysts could timely switch to the latter instead of waiting for the complete result to become available.

Figure 3:
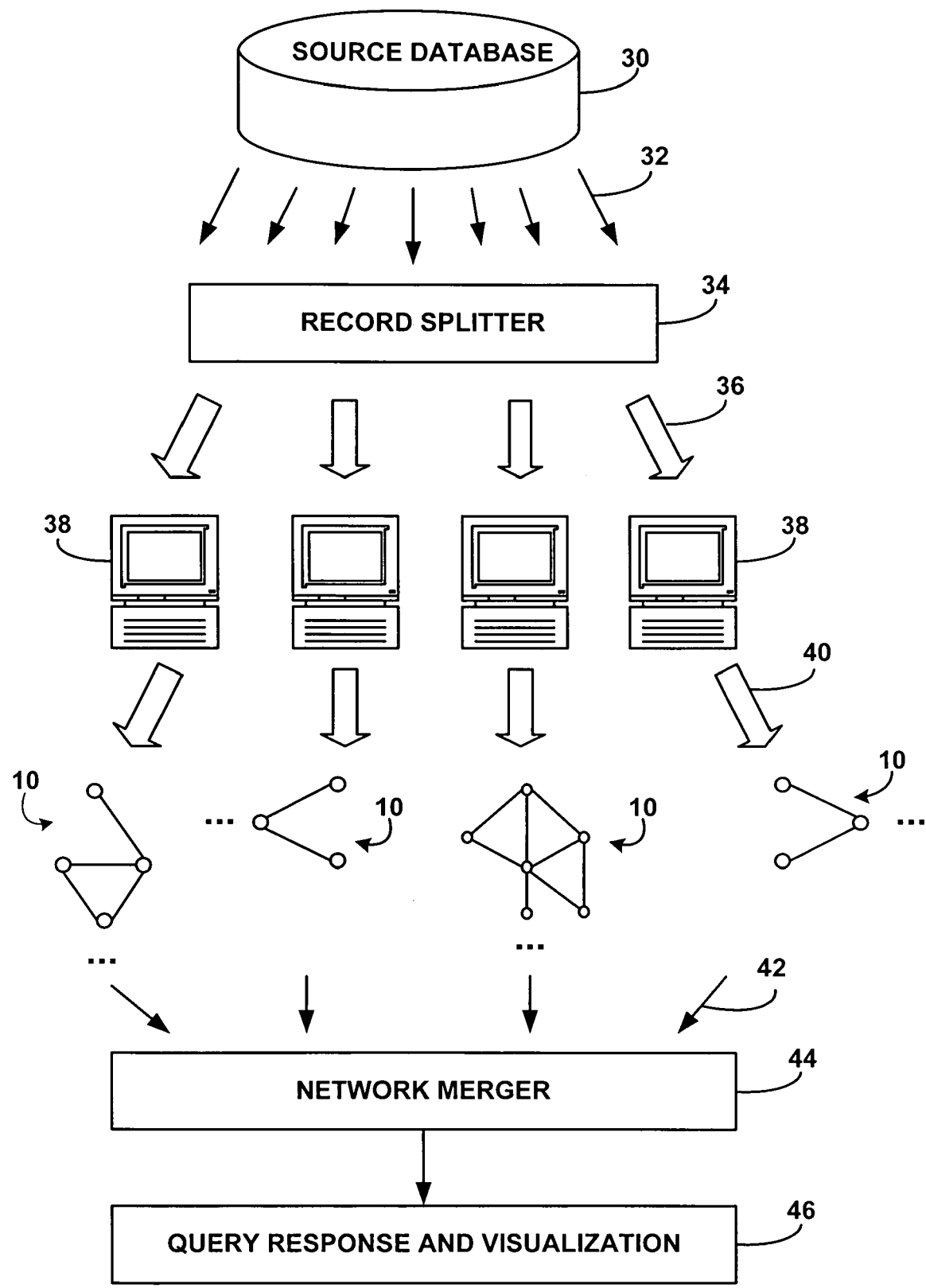
FIG. 3 is an illustration showing a process of obtaining input data in the form of records, distributing the records to a plurality of distributed computing nodes, generating and storing relational data at the distributed computing nodes, and, in response to a user query, merging one or more of the set of relational data and providing a response to the query. The query response may include a visualization component wherein the data is presented in graphical form, for example in the format of FIG. 1, FIG. 2 or in some other visual form, the details of which are not particularly important.

The core process for generation of complex networks or sub-networks from annotated records is implemented as a linear, incremental procedure that processes data at the level of a single observation unit in the input dataset (in this example, each publication, conference submission, etc.), and returns a list of relevant relations (data structure) that record gives rise to, as schematically shown in FIG. 3. Each relation is also associated with time information and any other relevant attributes that might be useful for subsequent analyses.

FIG. 3 shows a process of obtaining input data in the form of records from a source 30, which may be one or more database, distributing the records to individual computing nodes 38, and generation of networks 10. The records are provided to a network management system process described below (NMS) functioning as a record splitter 34, which then bunches and coordinates distribution of the records as illustrated by arrow 36 to a plurality of distributed computing nodes 38. The distribution of records indicated by arrow 36 is preferably performed with the aid of indexing and distribution optimization processes (IND and DOP) described below. The distributed computing nodes 38 generate the relational data and store the data locally. The generation process is indicated by arrow 40 and the resulting relational data is indicated by networks or sub-networks 10. In response to a user query, relational data is provided to another management module (Query Management System herein) which performs a network merger function indicated at 44. The Query Management System receives user queries of the system and provides a query response, indicated as block 46. The query response may include a visualization component wherein the data is presented in graphical form, for example in the format of FIG. 1, FIG. 2 or in some other visual form, the details of which are not particularly important. For example, the query response visualization could use off-the shelf knowledge visualization tools or other tools described in the above-referenced articles to Chen et al.

Consider the above example wherein a vast collection in input records is processed by the process of FIG. 3. An overall network can thus be built by merging elementary sub-networks from individual nodes 38.

The network merger process shown as step 44 in FIG. 3, is more a conceptual step, rather than an actual operation performed by some physical entity in the system, if it is meant as merging all of the available sub-sets of relational data into a single network. The main idea conveyed in FIG. 3 is that individual data processing 40 at each node 38 generates partial results in the form of subsets of relational data (sub-networks 10); when all of the latter contributions are available, the overall relational information is actually equivalent to a large monolithic network hypothetically generated at a single research center computing platform using local hardware and software resources only, as in the prior art.

This is to highlight the absence of lost relational information, i.e., the fact that the overall relational information that is generated by the present system is completely equivalent to traditional single-site network generation results. Indeed, it may even be impossible to generate some complex networks by means of traditional centralized generation techniques without applying a suitable pre-filtering to the input dataset in order to reduce the amount of processed source data; this mainly depends on available on-site resources. Conversely, the distributed computing system of this invention allows generation of complex networks that would otherwise be inaccessible using traditional approaches, apart from the availability and use of extraordinary computing capabilities, which could be peculiar to some advanced centers, but whose general unavailability makes traditional techniques not suited to large-scale network access when network complexity exceeds some reasonable threshold. In other words, the distributed approach actually allows access to an otherwise almost unreachable region of phase-space in terms of network complexity.

On the other hand, merging one or more of the sub-networks 10 as indicated at step 44 is a real operation that is performed by the Query Management System (QMS) when it generates a response to a user's query. For instance, suppose a complex network on diabetes (from input records comprising scientific publications) has already been generated from distributed input records, and made persistent as individual sub-networks across the nodes 38. Users may establish a connection to the QMS process in order to analyze that network, and request that a specific portion of the overall network be displayed (for instance, including a user-specified list of vertices or links). In this case, the QMS process is responsible for retrieving relevant sub-networks 10 from relevant nodes 38, and merging them into the user-requested view of the entire composite complex network on diabetes. In other words, the network merger function 44 does not necessarily take the whole set of available generated relational data as its input. Rather, it processes user-specified sub-samples. This increases flexibility of the system tailored to specific requirements of users and allows analyses on specific relational areas.

In the above scenario, there may be trivial requirements by the user for graph visualization, i.e., users request that the whole complex diabetes network be displayed in order to obtain an overall picture as a guide for subsequent browsing and research. The feasibility of this visualization feature in step 46 is provided by a software module (e.g., plug-in) associated with the QMS process that is responsible for graph visualization. The visualization aspect is not, strictly speaking, pertinent to the distributed network generation and storage features of this invention, and can be regarded as external hardware and software that can be added on to the system. Moreover, visualization of complex networks is an open issue in the field and the subject of ongoing research and development, the fruits of which may be useful in the present system. Some abstraction schemes may need to be implemented in order to reduce network complexity before visualizing via a graph, because very dense and complex networks can end up being unreadable and providing no useful information.

In order to effectively assign records to nodes for processing and retrieve data (networks) from the nodes in response to user queries, a computer hardware and software management subsystem is provided which generates and stores logs of activity of the distributed system and indexes of records and relational data created by the distributed computing nodes. By virtue of local storage of such logs and indexes, each node knows where source data or input records are stored locally, e.g., in local data repositories such as data storage devices, and where generated relational structures (sub-networks) are stored and shared for remote access by the Query Management System. Furthermore, each node may maintain a flag indicating whether any of the management processes are currently active or inactive in that node, and information (such as IP address) of which node or computing platform in the overall system is currently acting as the network management process, indexing process, dispatch optimization process and query management process.

Some processes that form the basis of this management subsystem are functionally defined in the following sub-sections, with reference to appended drawings. These processes include: a network Management System (NMS), an Indexing process (IND), a records Dispatch Optimization Process (DOP), and a Query Management System (QMS) process. These processes are preferably implemented in separate computing platforms. In a less preferred embodiment, two or more processes could be performed by the same computing platform. The computing platform may also provide functionality as a distributed computing node 38 generating sub-networks from input records. In a preferred embodiment, there are no central nodes responsible for running the above processes; rather, each of these runs at a particular node at a given time, according to a suitable optimization procedure. Log data is shared and mirrored, and any of the four processes can be transferred to different nodes when required, according to optimization criteria taking node-level resources into account. The system is thus characterized by a sizable degree of robustness, and each process can be transferred from one node to another without breaking the overall computational flow, or leading to incomplete or inconsistent log information. However, an instance of each of the above processes is running at some computing platform or node in the distributed system at any given time. This can be achieved by means of the process transfer procedure that will be described later in conjunction with FIG. 13. Furthermore, data mirroring of log data and/or suitable local redundancies of log data will facilitate dynamic transferring of one process to another in a seamless manner.

Figure 4:
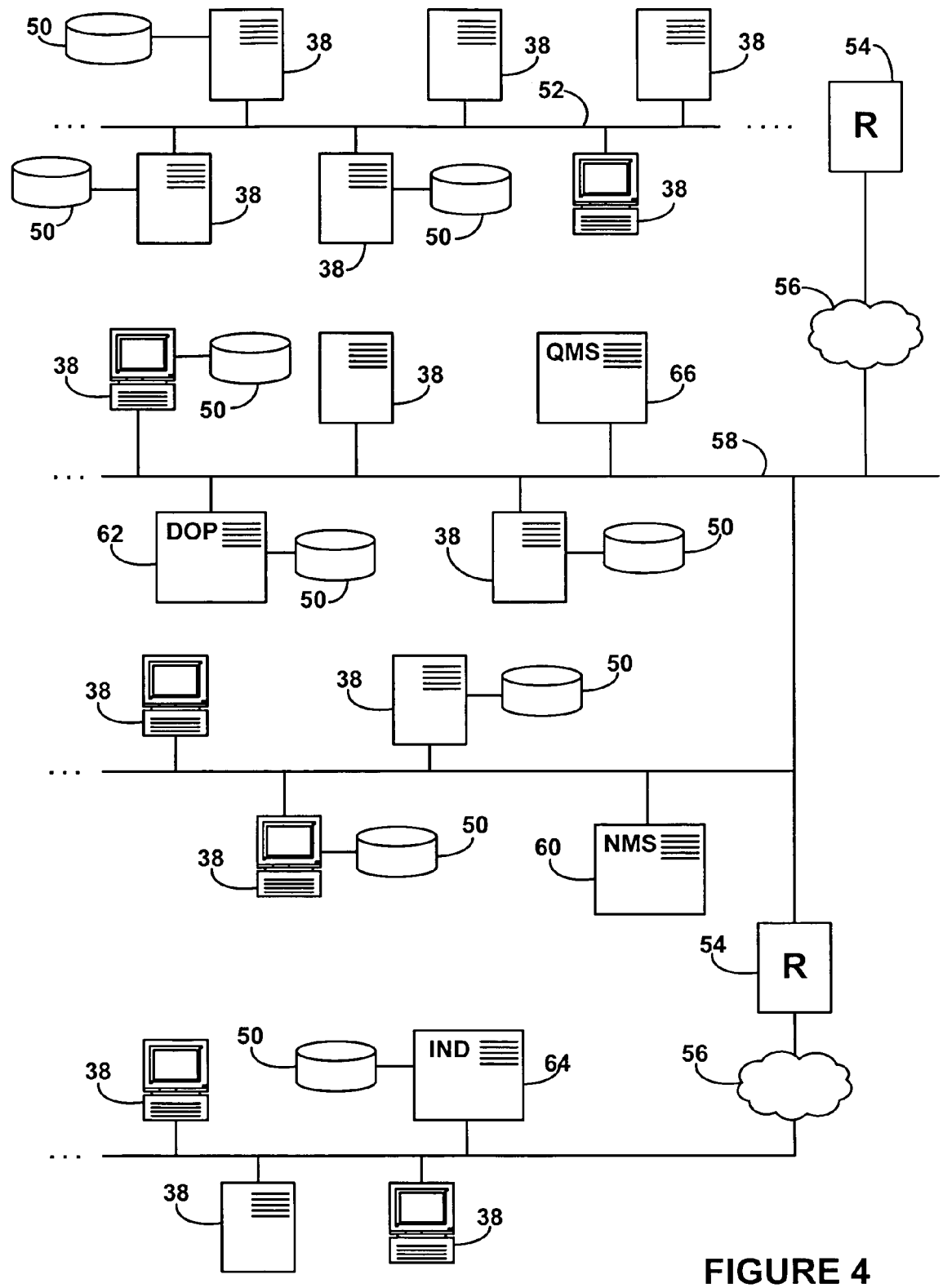
FIG. 4 shows a distributed computing system including distributed computing nodes that generate and store relational data as shown in FIG. 3, and four of such distributed nodes comprising computing platforms performing a network management system process (NMS), a dispatch optimization process (DOP), an indexing process (IND) and a query management process (QMS). The computing platforms performing these four processes may, but not necessarily, function in addition as distributed computing nodes generating and storing relational data. One or more of these processes could be implemented at the same computing platform.

FIG. 4 shows a distributed computing system including distributed computing nodes 38 that generate and store relational data in the form of sub-networks 10 as shown in FIG. 3. The nodes include local data storage devices 50 for storing relational data in the form of input records, which may take the form of internal memory cards or attached peripheral devices or shared memories. Some nodes 38 may be connected to one or more local area packet switched networks 52 and 58. Routers 54 are provided to connect the local area networks 52 and 58 to intermediate packet switched networks 56, such as the Internet. Standard peer-to-peer networking techniques and communications protocols are used to communicate between the nodes. A user may access the system via a user interface device provided at any of the nodes 38, or via any other computing device that can communicate with the system.

Four of such distributed computing nodes 38 are configured to function as a management sub-system for distributing records to the nodes 38 and responding to user queries. Such nodes are shown as computing platforms that implement a network management system process (NMS) 60, a dispatch optimization process (DOP) 62, an indexing process (IND) 64 and a query management process (QMS) 66. The computing platforms performing these four processes may, but not necessarily, function in addition as distributed computing nodes generating and storing relational data. Such processes 60, 62, 64 and 66 are preferably, but not necessarily, performed by discrete computing resources. Further, the system has the ability to dynamically reassign the processes 60, 62, 64 and 66 as described subsequently in FIG. 13 as may be needed to optimize performance of the system.

The four management processes 60, 62, 64 and 66 will be described in greater detail below. At a high level, the network management system (NMS) process 60 primary function is to coordinate the dispatch of input records to the distributed computing nodes 38. The process 60 may have other optional functions, such as session management, storage of log data, coordinate registration of new nodes or deletion of nodes, and others described in detail below. For example, if part of the network generation process took place at node n1, was stopped for some reason (local failures, availability of better resources at new nodes that were added to the system, etc.), and was scheduled to be resumed at node n2, the NMS logs can be handled during process transfer from n1 to n2 in order to guarantee computational flow consistency and continuity.

The optimization process DOP 62 primary function is to optimizing the dispatch of records, or batches of records, to the nodes 38. Since each record can be independently processed to generate the corresponding building block (or sub-network) for the resulting network, as previously described, it could be advisable to schedule different groups of records ("record bunches" herein) to be processed and stored at different nodes. The DOP process 62 is responsible for optimizing the composition of record bunches distributed to nodes according to local computing resources at the nodes, direct availability of local source data (input records), e.g., in the case where a given record has been previously sent to a node 38, and additional customizable optimization criteria explained in detail below.

The primary function of the indexing process IND 64 is to create and store an index of records dispatched to the nodes 38 and the relational data generated at the nodes 38 (e.g., which vertices in a network or sub-network 10 (FIG. 3) are stored locally at which nodes 38). Information about which records, and which vertices and links in a network are stored at each node 38 is provided by the IND process 64 to the DOP 62 for the record bunch optimization procedure referred to above. A natural approach is to set up indexes containing this information, and have them shared across nodes 38. Local index modules ("indexers") run at each node 38, processing local relational information and input records (source data) and generating shared indexes, as well as status reports for local validation of index information. The IND process 64 is then provided with the resulting information from all the nodes 38, and is responsible for solving possible conflicts and releasing validated distributed indexes to the DOP process 62 and the nodes 38.

The relational data indexes generated in the IND 64 process are also used by the QMS process 66 to retrieve relevant relational data in response to user queries. Source data indexes can be used by the QMS process 66 to retrieve input records or portions thereof, such as, for example, Abstracts or full text of input records in the form of publications.

The primary function of the query management process (QMS) 66 is to respond to user queries and provide transparent access to the relational data stored locally in the distributed nodes 38. The distributed architecture allows the QMS 66 process to transparently allow user access to distributed networks throughout the de-centralized system outlined in FIGS. 3 and 4. It is thus possible to perform analyses even across geographically distant locations using standard networking protocols (such as TCP/IP protocols) and peer-to-peer networking techniques known in the art. This feature has major advantages with respect to traditional, centralized approaches. Firstly, distributed storage and management resources can be exploited. Secondly, analyses can be performed as if all relational data were centrally available when in fact they are stored in a distributed manner. The QMS process 66 responds to users' queries (regardless of the where such query may have originated), check indexes provided by the IND process 64 to identify which nodes host relevant information, and then acts as an intermediary providing optimized access to the user's requested data.

Thus, to summarize FIGS. 3 and 4 and the above discussion, it will be appreciated that a system has been described for distributed generation and storage of relational data which can be represented as a network or sub-network 10, comprising:

a plurality of distributed computing nodes 38 generating and storing relational data from input individual records; and a decentralized software and hardware management sub-system for distribution of input records to the distributed computing nodes and for providing access to the relational data to a user, comprising:

a) a network management system process 60 coordinating the dispatch of input records to the distributed computing nodes 38, b) an optimization process 62 for optimizing the dispatch of records to the nodes, c) an indexing process 64 for indexing of records dispatched to the nodes and relational data generated at the nodes, processing index data into validated, overall indexes, and providing overall validated index information to the optimization process or other processes as needed; and d) a query management process 66 for responding to user queries and providing transparent access to the relational data.

The method of operation of the system can be summarized as follows: receiving a collection of individual input records (32 in FIG. 3); distributing the records to a plurality of individual, distributed computing nodes 38 (process 36 in FIG. 3); at the individual computing nodes 38, generating relational data from the records which can be represented as networks or sub-networks and storing the relational data locally (process 40 at FIG. 3 and the networks or sub-networks 10), and creating an index of source and relational data stored at individual computing nodes to facilitate access to the data in response to a user query (function of IND process), whereby the relational data 10 for a set of multiple individual input records is generated and stored across a plurality of individual computing nodes 38.

The indexing step can be considered as consisting of the following steps: a) at the individual computing nodes, indexing local record data; b) providing local record data indexed at the individual computing nodes to a computing platform executing an indexing process (IND); c) indexing the relational data generated at the individual computing nodes at the computing platform executing the indexing process; and d) using the index of the relational data to select relational data to respond to the query from the user. The response to the user's query is generated by a query management process (QMS) accessing indexing data provided by the computing platform executing the indexing process. Further, as explained above, the step of distributing the records to a plurality of individual computing nodes is optimized according to at least one of (a) local computing resources available at the individual computing nodes, (b) pre-existing availability of the records or portions thereof at the individual computing nodes or storage devices accessible thereto, and (c) customizable optimization criteria.

Network Management Process 60

Figure 5:
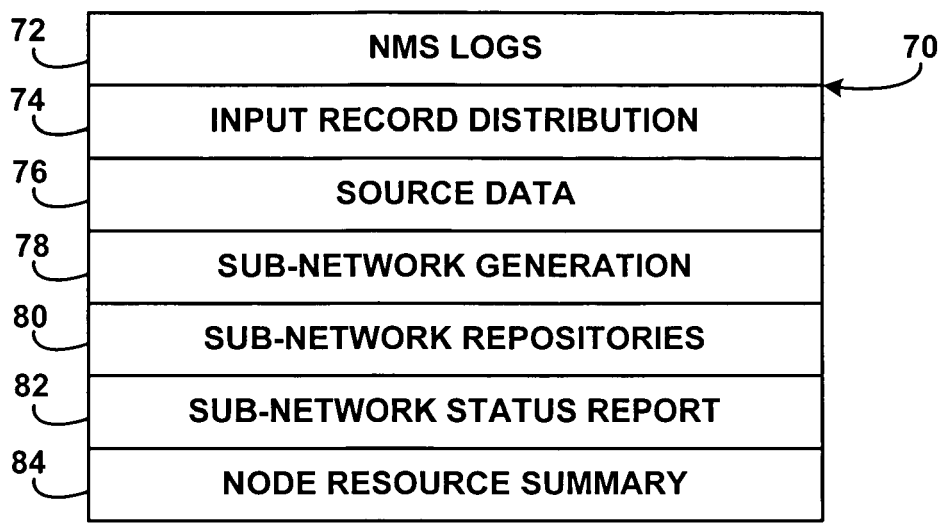
FIG. 5 is an illustration of software processes executing on a computing platform running network management process in the system of FIG. 4.
Figure 9:
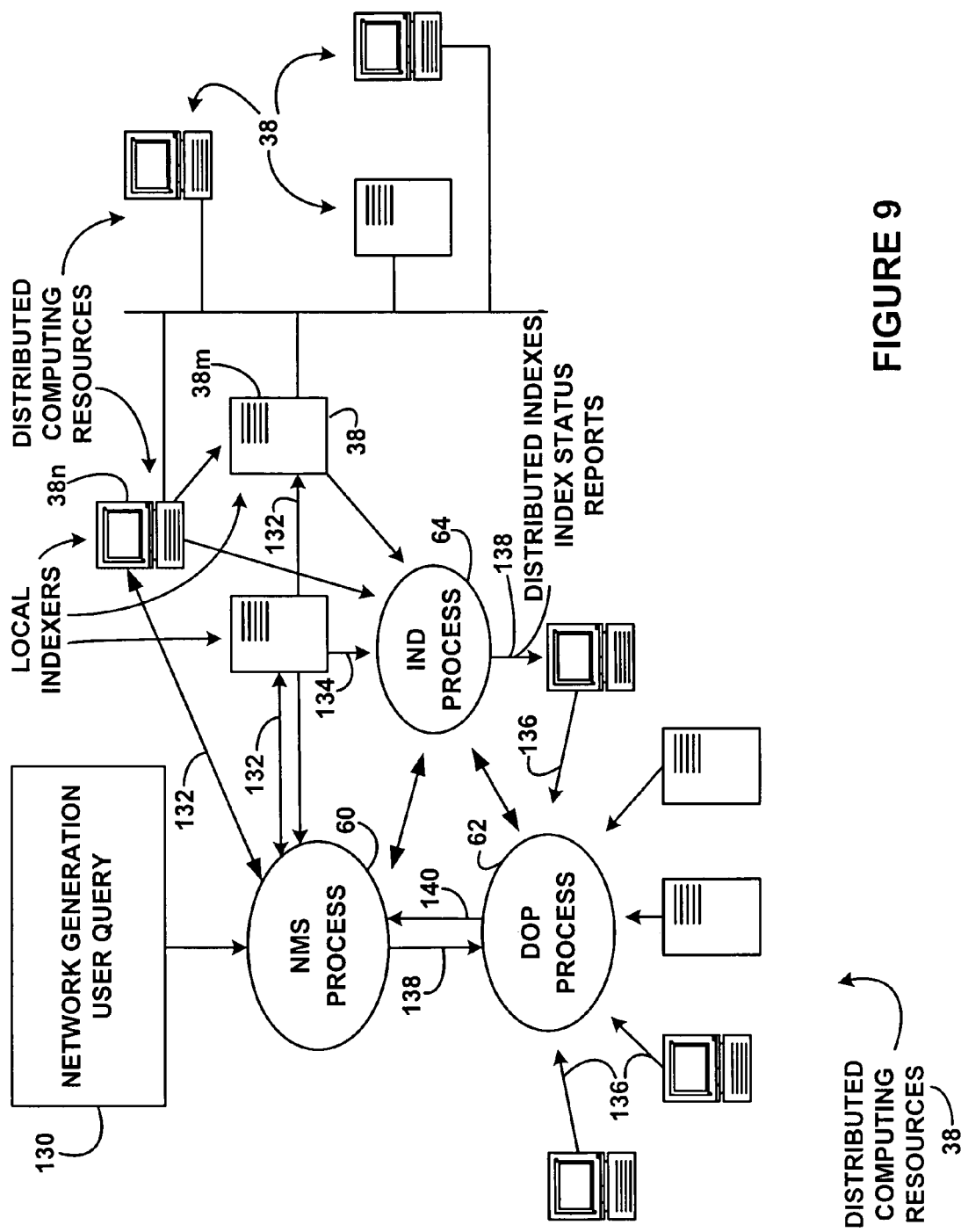
FIG. 9 is a schematic representation of inter-process communication flows between the elements of FIG. 4 during a first part of a process of generation of relational data from input records.
Figure 10:
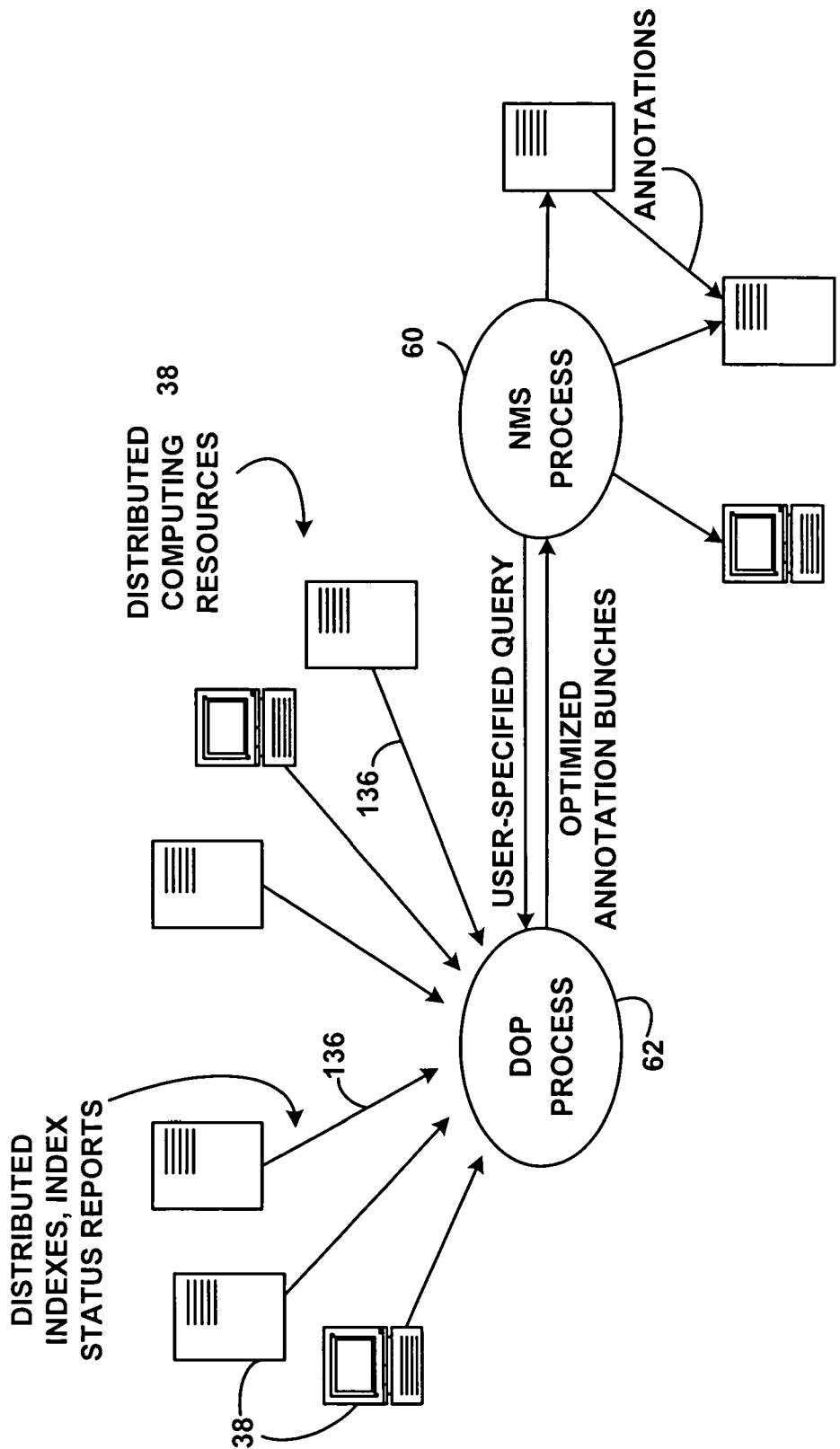
FIG. 10 is a schematic representation of inter-process communication flows between the elements of FIG. 4 during a second part of a process of generation of relational data from input records.

The network management process 60 will now be described in further detail in conjunction with FIGS. 3, 4, 5, 9 and 10. FIG. 5 is an illustration of software processes 70 executing on a computing platform (e.g., node 38) running the network management process 60 in the system of FIG. 4. FIG. 9 is a schematic representation of inter-process communication flows between the elements of FIG. 4 during a first part of a process of generation of relational data from input records. FIG. 10 is a schematic representation of inter-process communication flows between the elements of FIG. 4 during a second part of a process of generation of relation data from input records.

The NMS process 60 is preferably implemented in a computing platform (e.g., general purpose computer or workstation) having a central processing unit (not shown) and a machine-readable storage medium containing a set of instructions for execution by the processing unit. The instructions comprising modules for performing the following functions: (i) receiving a set of input records; (ii) querying the dispatch optimization process 62 and responsively receiving information as to an optimized grouping for dispatching of the set of input records to the distributed computing nodes 38, and (iii) coordinating the dispatching of input records to the distributed computing nodes 38 in an optimized manner.

Figure 14:
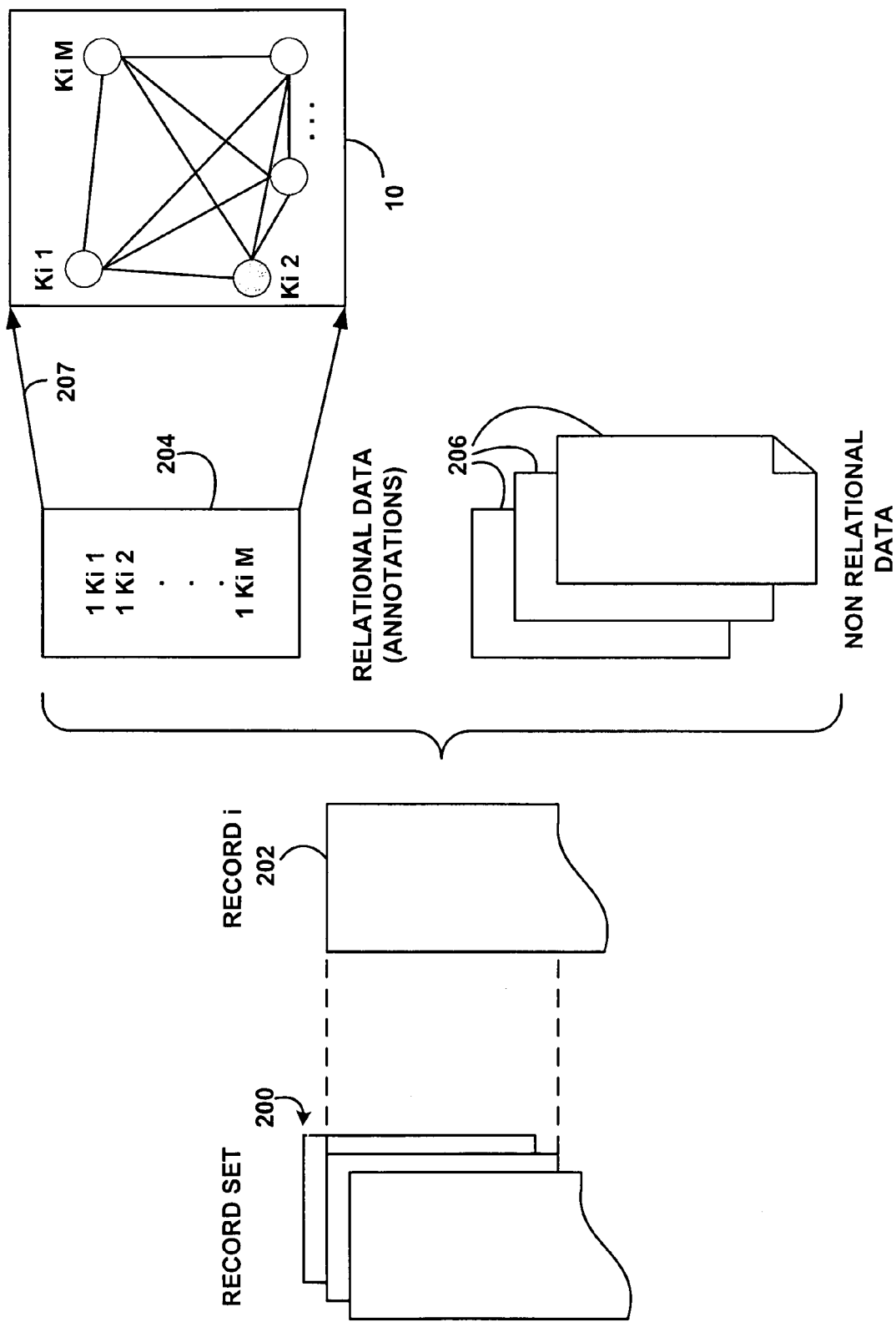
FIG. 14 is an illustration of relational data in the form of annotations in a record which are processed into co-occurrence networks, in which links are defined by simultaneous occurrence of entities or relationships in individual input records.
Figure 15:
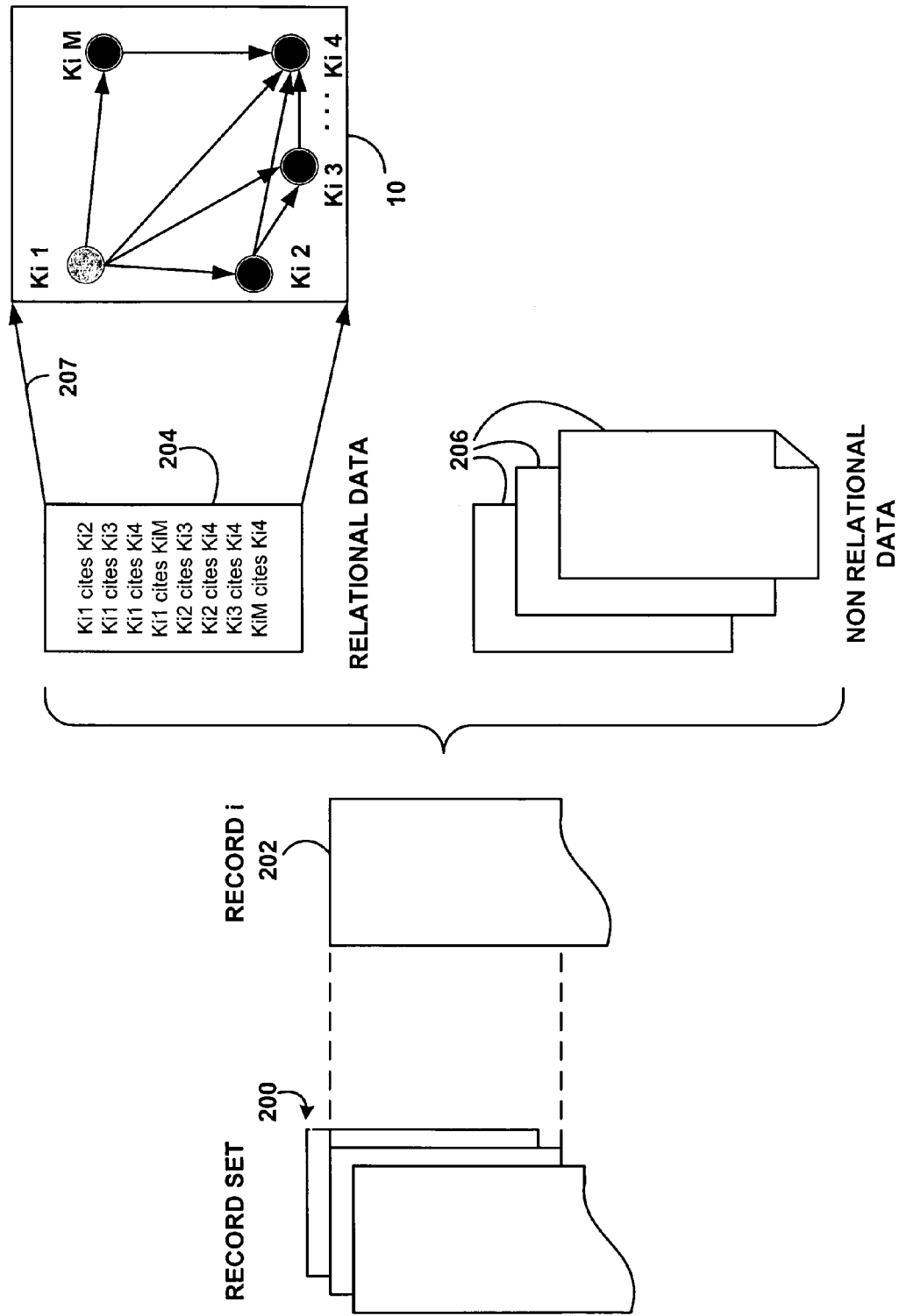
FIG. 15 is an illustration of relational data in the form of annotations in a record which are processed into citation networks.

These three modules can be considered as subroutines of the input record distribution process shown as block 74 in FIG. 5. The other processes 70 include a NMS process 72 generating a log of functional activity performed by the NMS process 60, a process 76 storing source data in a local or shared data repository; and a sub-network generation process 78. The process 78 uses available record annotations or other specified relational information in input records and generates relational data corresponding to sub-networks 10, as depicted in FIG. 14 based on process 207. In a sample embodiment, the latter process 207 establishes ties among entities (keywords, authors, or other relevant record attributes) occurring in at least one common record. Other embodiments may use different implementations of the process 207, as depicted in FIG. 15, wherein citation information drives directed relations in the resulting network or sub-network, which are represented by arrows in the corresponding graph. Details of the process 207 are not important and are known in the art and therefore do not limit the scope of the invention.

Process 78 is not specifically pertinent to the function of coordinating the distribution of records to the computing nodes. Rather, this process is performed in the embodiment where the computing platform performing the network management system process is also one of the computing nodes.

A sub-network repositories process 80 stores generated relational data into local optimized data structures for network persistence, as part of a transparently accessible de-localized system. Again, this process is pertinent to the situation where the computing platform executing the network management process also functions as a distributed computing node.

A process 82 generates sub-network status reports resulting from dedicated ad-hoc, semi-automated or automated validation procedures, which mark valid results as suitable to be released and used throughout the system. Again, this process is pertinent to the situation where the computing platform executing the network management process also functions as a distributed computing node.

Process 84 stores information relevant to locally available hardware and software resources in dedicated data structures that are available throughout the system to other relevant processes.

The main functions of the NMS process 60 are best illustrated in FIGS. 9 and 10. When a user starts a session with the system for network generation, the corresponding request 130 (and any appended collection of input records) is forwarded to and managed by the NMS 60. All details about node resources and index status are available to the DOP process 62; for instance, the DOP process 62 knows that publications related to a given protein or disease prior to 1980 are hosted by node 38$i$, and those published on the same issues after 1980 are stored at node 38$j$. This corresponds to arrows 136 connecting the distributed computing nodes 38 to the DOP process 62. The arrows 136 represent the transmission by the IND process of distributed indexes and index status reports to the DOP process 62.

The arrows 138 and 140 between the NMS process 60 and the DOP process 62 in FIG. 9 indicate a two-way communication between those processes. Based on information received from the DOP process 62, the NMS process 60 packages or composes individual input records into bunches of records, and marks them for submission to individual nodes 38 that will be responsible for the actual processing of input records and sub-network (relational data) generation. The transmission of records to individual nodes is represented by arrows 132.

Figure 11:
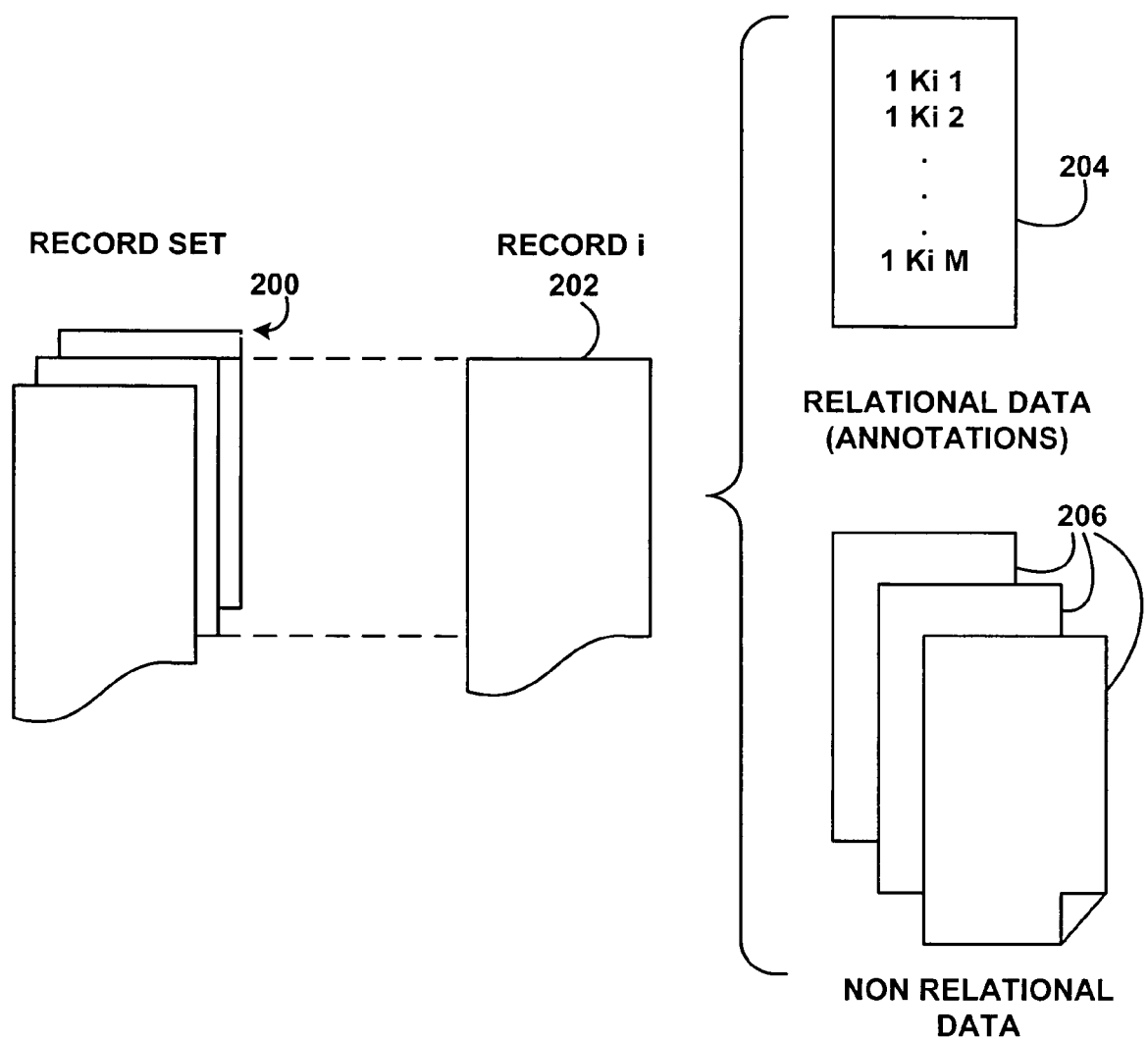
FIG. 11 is schematic representation of input records, showing an embodiment in which input records consist of both relational data in the form of annotations and non-relational data such as text.

Suppose that input record Ri is scheduled to be processed by node 38$m$. If Ri is already part of the local source data repository at 38$m$, it can be processed right away; on the other hand, if that record is already hosted by node 38$n$ (this information is available to DOP process 62 through index data obtained from IND process 64), the NMS sends a request to node 38$n$ to transmit annotations for record Ri to node 38$m$ for processing, as indicated by arrow 133. This can reduce overhead in traffic between the nodes and the NMS process 60. It will be noted from FIG. 11 that two typologies of record-level information for record Ri are defined. Record set 200 contains individual records Ri 202. The records can contain relational data (such as annotations K1, K2, . . . Kn 204 or other type of relational information) and non-relational data 206, which can consist of text, graphics, chemical structures, or other type of data. As shown in FIG. 9, only relational data are normally exchanged between nodes, as they usually correspond to light-weight information that can be easily transferred. Non-relational data could also be transferred between nodes if needed.

Referring to FIG. 10, a more detailed explanation of basic processes involved in record bunch optimization will be described. As explained above, the DOP process 62 uses index and node-level resource information obtained from the distributed nodes 38 (indicated by arrows 136) to define a suitable strategy for NMS 60 to request individual nodes to generate sub-networks. In particular, DOP process 62 provides NMS 60 with a specification or schedule of optimized record bunches based on the user-specified query (identification of set of input records). The schedule of optimized record bunches is based on the user-specified query identifying a set of input records, available index data as to which nodes host which source data, node-level hardware and software resources, and possibly other factors, and includes a specification of record bunch composition in terms of individual source records, as well as a mapping between those record bunches and IP addresses of the distributed nodes that are scheduled for processing them. The NMS process 60 in turn coordinates the transmission of the records to the distributed nodes 38 and/or requests relevant nodes to send annotations to those responsible nodes for processing.

The NMS process 60 may also perform other functions. One example is multiple-session management. One can consider individual dedicated sessions as being those started by one analyst or group of analysts who have established a connection to the overall distributed system in order to explore a specific portion of an existing distributed network, which, in turn, was obtained during some past network generation session by them or by other users. When such analyst or analysts re-accesses the system, the NMS could retrieve previous queries or results and otherwise facilitate or manage the new session. Multiple simultaneous sessions might also be supported and handled by NMS, individual authenticated users having their own profiles as to permissions to access existing networks, generate new relational data structures, and contribute to validation of indexes of source data or generated sub-networks; this is similar to different users having different privileges for access to and use of a computer file system.

The logs generated in the NMS log process 72 (FIG. 5) refer to any information relevant to the functional behavior of above processes executing on the NMS platform (each process having its own logs). For example, a NMS log includes, among the others, the following information corresponding to a network generation session:

- connected user's authentication information, e.g., the IP address of the workstation that started the session (inside or even outside of the system if applicable and appropriate).
- user's query to the datasource (30, FIG. 3) to retrieve input records for network generation.
- messages exchanged with DOP.
- record bunch composition (i.e., the groupings of records sent to specific nodes 38 for processing).
- mapping between record bunches and processing nodes' IP addresses.
- information received from nodes about completion of sub-network generation tasks (arrows 132 from NMS process to individual nodes 38 are actually two-way, as they correspond to two-way communications, such as acknowledgements of completion of tasks, etc.).
- timing information associated to all of the above steps.

Each distributed computing node 38 is responsible for several tasks in order to have the overall system perform as described. These functions include:

- storing locally source input record data (for example, publications in electronic format in specific substantive areas that the research center focuses on).
- indexing local source data, basically, which publications are available at that node; this data is then fed into the IND process 64 as indicated by arrow 134. The IND process 64 is responsible for building overall index data based on information received from individual nodes. Such overall index data can be distributed to the nodes 38 as indicated by the arrow 138.
- generating and storing sub-networks from optimized record bunches sent by NMS process 60 (these are the relations defining sub-networks, or, equivalently, the local network repositories).
- indexing the generated sub-networks in order to allow the QMS to effectively retrieve relational information associated with given vertices/links. Basically, such indexes identify which vertices and links in a given network or sub-network are stored at that node.

The data structures resulting from all of the above processes (inter-operation of NMS, DOP, and IND processes and the processing of records at the distributed nodes) results in a distributed generation and persistence of relational data that can be represented as networks.

FIG. 14 is an illustration of relational data 204 obtained from a set of records 200 which are processed (as indicated at 207) at a node 38 into co-occurrence networks, in which links between individual annotations Ki1, Ki2, . . . , KiM are defined by simultaneous occurrence of entities or relationships in individual input records. Each record 202 in this example consists of a single publication, the set of records 200 consists of a set of N publications.

FIG. 15 is an illustration of relational data 204 obtained from a set of records 200 which are processed (as indicated at 207) into citation networks. Whereas co-occurrence networks are undirected, in citation networks the network is directed, that is, the link orientation or direction in the corresponding graphical representation of the network has meaning. Such directionality is indicated by the arrows linking the vertices Ki1, Ki2, . . . , KiM. Such arrows reflect the citation pattern in the input set of records 200. Each record 202 in this example consists of a single publication, the set of records 200 consists of a set of N publications.

The external visualization tools available to the query management process described herein provide a means for visualization of the networks 10 of either FIG. 14 or FIG. 15. Different types of networks besides the two examples shown in FIGS. 14 and 15 may also be processed by the nodes, and the visualization tools available to the QMS process will be configured to graphically present the networks (relational data) constructed and stored at the nodes.

Dispatch Optimization Process 62

Referring to FIGS. 3, 4, 9 and 10, another component of the decentralized management subsystem is the dispatch optimization process (DOP) 62, whose functions have been described in some detail above. This process is preferably implemented in a general purpose computer having a central processing unit and a machine-readable storage medium containing a set of instructions for execution by the processing unit. The instructions include modules for performing the functions of: (i) determining processing resources available to the distributed computing nodes, (ii) determining any pre-existing availability of input records or portions thereof at the individual computing nodes 38 or storage devices accessible thereto, and (iii) in response to information as to an input set of records, using modules (i) and (ii) and additional customizable optimization criteria to create a schedule for optimized distribution of the input records to the distributed computing nodes, and (iv) providing the schedule to the network management system process 60 distributing the input records to the distributed computing nodes 38. The functionality of such modules is explained in FIGS. 9 and 10 discussed above.

Figure 6:
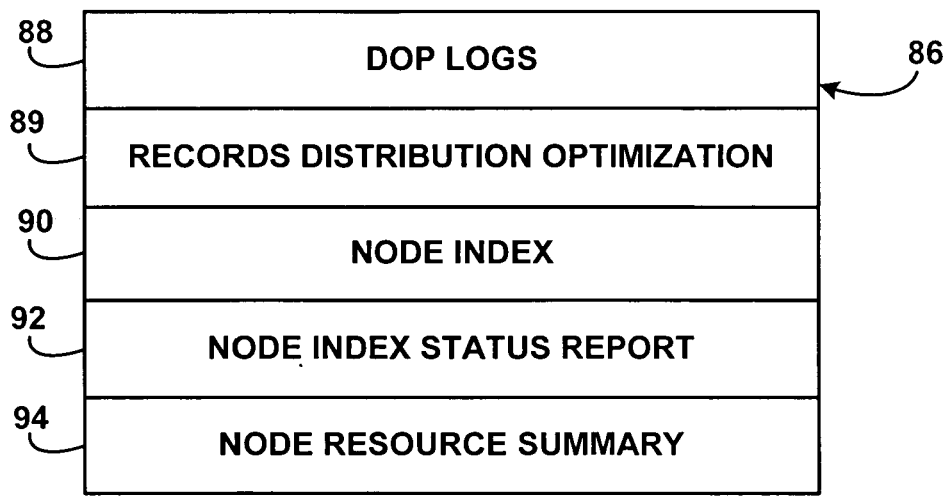
FIG. 6 is an illustration of software processes executing on a computing platform running a dispatch optimization process in the system of FIG. 4.

FIG. 6 is a diagram showing the processes and information 86 that are available at the dispatch optimization module. The modules (i)-(iv) above can be considered as sub-routines of a records optimized distribution module 89. Process 88 generates a log of the functional behavior of the dispatch optimization module 89.

Node index 90 represents node information on relational data and input records available across the computing nodes in the system. Node index status report 92 represents status reports for the indexes. Node resource summary 94 is the same as node resource summary 84 of FIG. 5 described previously. The node index 90, node index status report 92 and node resource summary 94 are not necessarily unique or specific to the DOP process. They provide information that the DOP process needs to have in order to behave in accordance with the specifications of the system.

Since each input record can be independently processed to generate the corresponding sub-network, as previously described, it is advisable to schedule different record bunches to be processed and stored at different nodes. The optimization of the distribution of input records (typically as bunches or collections of records) to the processing nodes 38 is the basic function of the DOP process 62.

The DOP process 62 optimizes record bunch composition according to several possible criteria, including available local resources in the nodes 38; direct availability of local source data (e.g., in the situation where the record was previously sent to a node or nodes) and additional customizable optimization criteria. In order to make the latter point clearer, consider the following scenario. Let Q be a user's query, retrieving records R1, . . . , Rn from the distributed data source. If records Rk, . . . , Rl ($1 \leq k \leq l \leq n$) are directly available at node n, the most straightforward solution would be to build and store the corresponding sub-networks at that node. However, if accessibility of the resulting overall network is a major concern, one needs to complement this with additional criteria aimed at easing network exploration (in general, this strongly depends on specific requirements, and can be customized accordingly), such as by considering issues of "neighbourhood coverage" and "completeness."

Neighbourhood coverage corresponds to information relevant to adjacent vertices in the overall network being stored at the same node. In the case of a geographically distributed system, this would help minimize access overheads to the resulting network. Completeness corresponds to all relevant information for a given link being stored at the same node.

In general, meeting all of the above criteria at the same time is not possible, and compromises need to be identified as far as optimization of bunch composition goes. It would also be advisable to support a system of local caches of input records as part of this optimization.

Indexing Process 64

Validated information about which records, and information as to relational data such as nodes and links in generated sub-networks, are stored at each node. The IND process 64 is responsible for collecting, validating and distributing such information in the form of indexes. Such information needs to be available to the DOP process 62 for the record bunch optimization procedure referred to in the previous section to take place. A natural approach is to set up indexes containing this information, and have them shared across nodes 38. A single computing platform is preferably provided to run the Indexing process IND 64 and provide for validating index information and sharing index information to other nodes 38 in the system, to the NMS process, to the DOP process and to the QMS process.

Local indexer routines are executed at each node 38, processing local relational information and generating shared indexes, as well as status reports for local validation of index information. The IND process 64 is then provided with the resulting information, and is responsible for solving possible conflicts and releasing validated distributed indexes to the DOP and the other nodes and processes.

Figure 7:
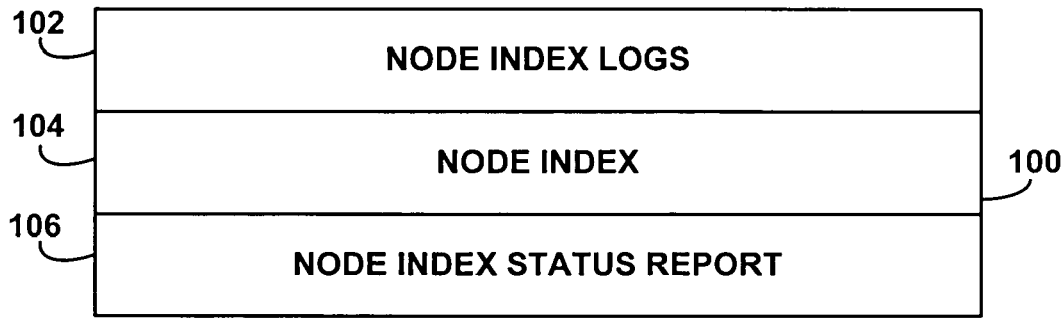
FIG. 7 is an illustration of software processes executing on a computing platform running an indexing process in the system of FIG. 4

FIG. 7 shows software processes 100 that are part of the indexing process 64. These processes include a process 102 creating a log of functional activity relating to the indexing process. A process 104 obtains node index data from the distributed nodes 38 (including indexes from local source data repositories and indexed relational data relating to generated subnetworks as needed), and merges that information into unified, overall indexes wherein possible conflicts have been resolved taking in account the results of the status report generation process 106. A process 106 generates node index status reports or retrieves the corresponding information from similar dedicated processes running at the individual processing nodes 38), which may or may not include semi-automated or automated validation procedures of stored data and indexes, and processes them in order to build overall indexes related to source data and generated networks, taking the results of node-level index validation processes similar to process 106 itself into account as needed; the result of the latter procedures can be in the form of status codes providing information as to whether or not individual pieces of information are to be marked as usable throughout the system or not, or similar information.

The node index process 104 includes several components, including components that perform the following functions: (i) retrieving indexes of the input records and relational data from individual computing nodes 38, and resolve possible inconsistencies among related information at different nodes to thereby general validated, overall indexes; and (ii) provide validated index information to the dispatch optimization process (DOP) to allow it to optimize coordination of the dispatch of input records to the distributed computing nodes. The indexing process IND 64 also provides source data and relational data index information to the query management system (QMS) process responding to user queries and retrieving relational data from the distributed computing nodes for network exploration and analysis. The functioning of the modules 100 of FIG. 7 was further explained above in context of FIGS. 9 and 10.

The indexing process 64 is preferably implemented in a computing platform including a central processing and memory storing software instructions coding the processes of FIG. 7. The instructions include instructions for implementing the dynamic assignment of the IND process to another node as described in FIG. 13.

Query Management Process (QMS 66)

The management subsystem further includes a computing platform providing a query management process (QMS 66). The platform includes a central processing unit and a machine-readable storage medium containing a set of instructions for execution by the processing unit. The instructions for the QMS process 66 comprise modules for providing the following functions: (i) receiving a user query of the system; (ii) checking an index of distributed source and relational data and associated distributed computing nodes storing the distributed source and relational data (e.g., by query of IND process 64 or its own memory storing indexing data) to determine distributed computing nodes storing relational data responsive to the user query, (iii) retrieving relational data from the distributed computing nodes responsive to the user query, and (iv) providing the relational data to the user in a convenient form. Where data is obtained from multiple nodes, and where pertinent to response to a user query, the QMS process may also include a module merging relational data from two or more distributed computing nodes, which may also include solving possible conflicts among related pieces of information hosted by different nodes 38 taking index status reports into account. Further, the QMS process may also support the use of visualization tools to facilitate graphical presentation of relational data to the user in response to the user query.

Figure 8:
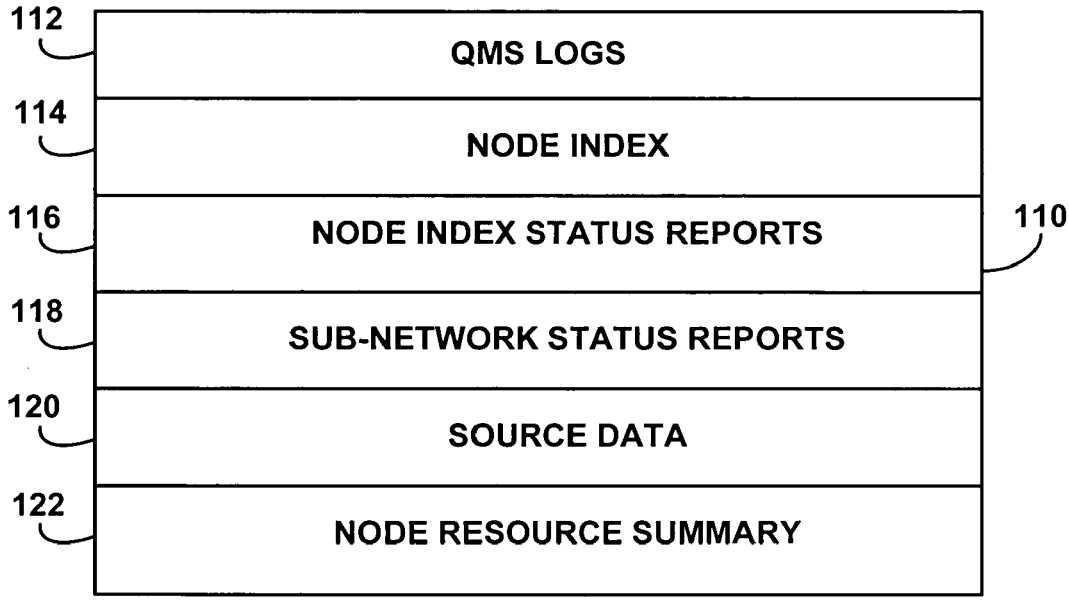
FIG. 8 is an illustration of software processes executing on a computing platform running a query management system process in the system of FIG. 4.

The processes or modules making up the QMS process 66 are shown in FIG. 8 at 110. Module or process 112 creates a log of functional activity relating to the QMS process. Process 114 stores validated node index data, e.g., relational data (vertices and links) stored at each of the nodes in the distributed system. Process 114 checks local node index repositories in order to identify which nodes 38 host relational information (nodes or links) or information about source data relevant to the user query, and retrieves such information as needed. Process 116 receives information from local node index status reports at individual nodes about source data (whose attributes may be required for network exploration and analysis), and uses it when inconsistencies arise among related information at different nodes. Process 118 retrieves information about sub-network status reports (i.e., about relational data corresponding to generated sub-networks) from relevant nodes 38, and uses it when inconsistencies arise among related information at different nodes. Process 120 stores and retrieves source data (input records). Process 122 stores node resource summaries. Processes 120 and 122 refer to relevant information that needs to be accessible to the QMS process for the system to behave correctly.

The QMS process further includes instructions (not shown) for dynamically transferring execution of the QMS process and creation of the log of activity from the computing platform to a second computing platform equipped with a processing unit and software coding the QMS process.

Annotation Management

As noted above, the process of dispatching of input records to nodes can be streamlined and performed in a more efficient manner in the situation where the NMS process directly coordinates dispatch of information to relevant computing nodes. In such a situation, the NMS process can direct one of the nodes storing annotation or other relational data for the input record to forward such information to a second node that is assigned the task of creating the corresponding sub-network from the input record.

Figure 12:
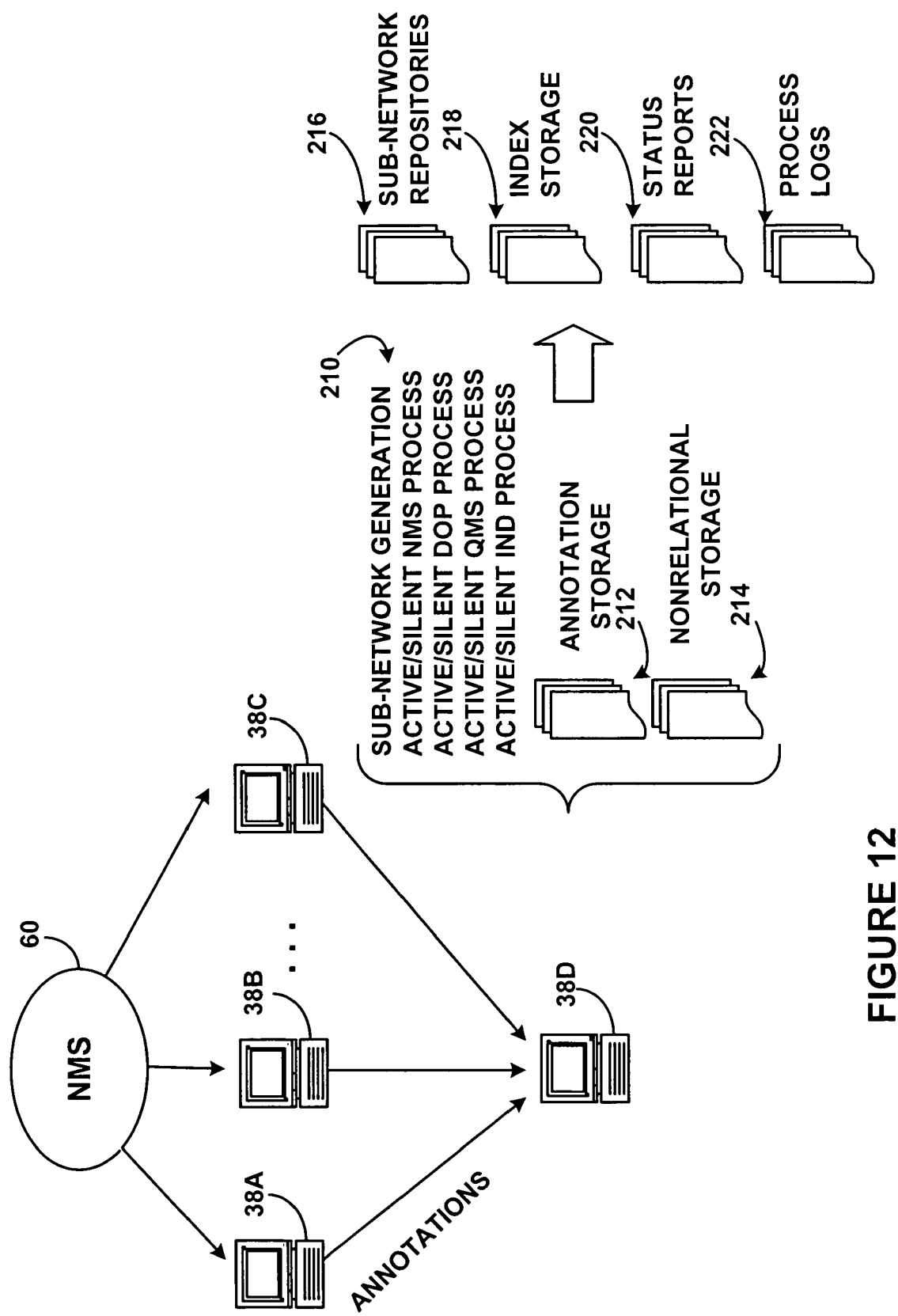
FIG. 12 is a schematic diagram showing a network management process coordinating the distribution of annotations from several distributed computing nodes to a designated computing node generating a sub-network (relational data) from input records located at the several distributed computing nodes.

Referring to FIG. 12, consider for example a situation where a user supplies the NMS process 60 with a batch of records. Some records are to be processed by node 38D, however some of the records are already stored locally at nodes 38A, 38B and 38C. If record i is to be processed for network generation at node 38D, but the annotations or other relevant relational data for record i already exist at node 38A, NMS requests node 38A to send relevant information (e.g., the annotations for the record i) to node 38D. Similar instructions are sent to nodes 38B and 38C since these nodes store annotations for records j and k. Since annotations are usually much lighter (fewer bytes of data) than non-relational record-level information, only the former will be transferred to node 38D; the rest of the record data can be transmitted later when it may be needed, e.g. during a user session exploring the resulting network. If information about record i is available at more than one processing module 38, the dispatch signal will be sent to the node with the best available hardware and software resources if appropriate based on status reports, unless status reports require merging pieces of information from multiple nodes.

As indicated at 210 in FIG. 12, the node 38D performs sub-network generation from the input records, maintains a state flag on whether any of the NMS, DOP, QMS or IND processes are currently active on that node, stores annotations or other relational data for its records locally as indicated at 212, and stores locally non-relational data for input records, as indicated at 214. As a result of the sub-network generation and other processes executing on the node 38D, multiple information is generated and stored, including in particular: sub-networks 216 (vertices and links); indexes of sub-networks 218 generated locally, status reports 220, and process logs 222.

NMS/DOP/IND/QMS Process Transfer

Figure 13:
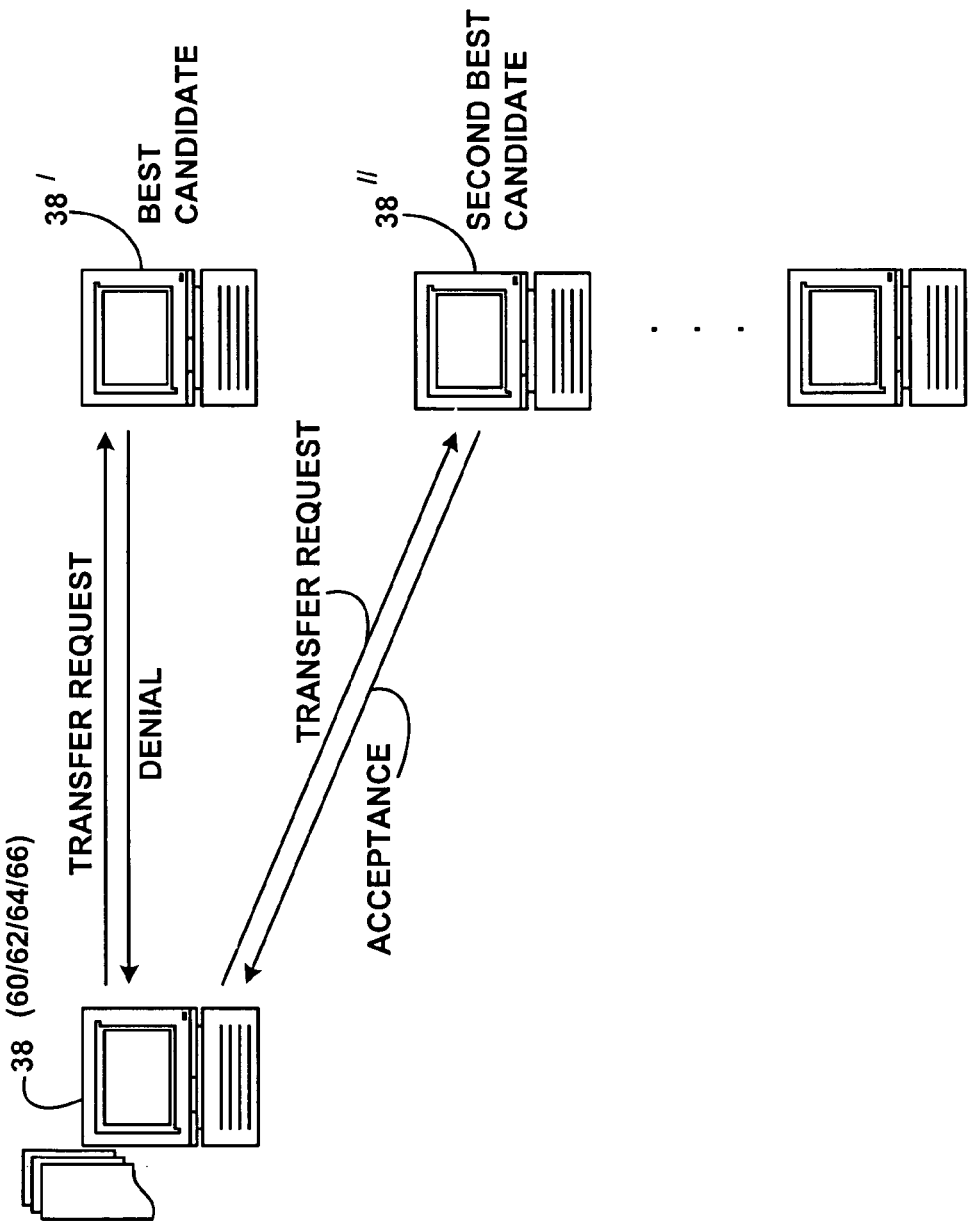
FIG. 13 is an illustration of a transfer process by which a network management system process (NMS), a dispatch optimization process (DOP), an indexing process (IND) or a query management process (QMS) can be transferred from one computing platform to another.

To achieve a robustness of the overall system and to account for the need for some computing platforms to go off-line (e.g., for maintenance), the system provides a process transfer mechanism by which the NMS, IND, QMS and DOP processes can be dynamically transferred from one computing platform, e.g., a node 38, to another. The process is shown in FIG. 13. Node 38 is currently executing the process 60/62/ 64 or 66 being transferred. The platform 38 includes software which generates a continuation request (transfer request) message and sends the message to other nodes in the system, based on node-level resource information. From such node-level resource information, a best candidate 38' to take over the process executing on computing platform or node 38 is identified and the continuation request is sent to best candidate 38'. The candidate 38' may not be able to function as a replacement and may send a denial message. Such message may be generated due to local processing conditions or load currently placed on the best candidate 38', lack of software to perform the function of the process being transferred, or other reason. The node 38 then sends the transfer request message to a second best candidate 38". The candidate sends an acceptance message back to the node 38. At this point, the process logs currently active on the node 38 are provided to the accepting node 38" (directly or otherwise), and the execution of the transferring process is transferred to the accepting node 38". Additional candidates for transfer of processes are identified, in the event that the second best candidate 38" is not available. Obviously, the candidate accepting the transfer of the process must be provided with the software instructions for executing all the functions of the process being transferred, as well as those for guaranteeing continuity and consistency to the computing flow. In one possible embodiment, all of the nodes 38 are provided with software for running all of the processes NMS/IND/DOP and QMS, and so each node 38 in the system is capable of functioning as any of the management processes. Also, as stated previously, the computing platform executing the NMS, IND, DOP and QMS processes could be computers or workstations that are not specifically functioning as distributed computing nodes generating sub-networks.

Addition and Deletion of Nodes

New nodes may be dynamically added to the system. Several possibilities are presented for the functionality or profile of new nodes. In one embodiment, new nodes register with the NMS process or a dedicated authentication service as a "host" node that are allowed to negotiate connections to the QMS process to access existing networks only, but cannot send requests to the NMS process or take part in distributed network generation and storage. In another embodiment, new nodes may be dynamically added to the system by registering with the NMS process or a dedicated authentication service as "fully functional" nodes, and are allowed to perform all the functions within the system (including distributed network generation and any of the four management subsystem processes), without limitation.

Nodes that are currently part of the system may need to be removed. In principle, multiple exit modes may be supported, including the following, without limitation:

a) the node is removed from the system, and both the corresponding source input records and sub-network data structures are lost; i.e., they are no longer available throughout the system after that node is removed;

2) the node exits the system after transferring annotations or other relational data it hosts to another node; in this case only non-relational information is lost, which, in general, can pose limits to exploration of resulting distributed networks, as specific micro-level information related to some input records might not be available any more.

While a number of exemplary aspects and embodiments have been discussed above, those of skill in the art will recognize certain modifications, permutations, additions and sub-combinations thereof that are within the scope of this disclosure. It is therefore intended that the following appended claims and claims hereafter introduced are interpreted to include all such modifications, permutations, additions and sub-combinations as are within their true spirit and scope. The term "publication" as used herein, is intended to be interpreted broadly to encompass both printed and electronic documents of whatever nature or source.

What is claimed is:

1. A system for distributed generation, storage, and providing access to data structures corresponding to networks or sub-networks and representing said data structures in a graphical form via an algorithm that supports generation, manipulation and visualization of said graphical form, comprising:
   a plurality of distributed computing nodes configured with software for generating said data structures corresponding to networks or sub-networks from input individual records, the data structures capable of being represented in a graphical form via an algorithm that supports generation, manipulation and visualization of said graphs; and
   a decentralized software and hardware management subsystem for distribution of input records to the distributed computing nodes and for providing access to said data structures corresponding to networks or sub-networks to a user, comprising:
   a) a network management system process coordinating dispatching input records or information associated therewith to the distributed computing nodes,
   b) an optimization process for optimizing the dispatch of records or information associated therewith to the nodes,
   c) an indexing process for indexing of records dispatched to the nodes or otherwise available to the nodes, and said data structures corresponding to networks or sub-networks generated at the nodes, processing local indexing data into overall indexes, and providing overall indexing data to the optimization process or other processes in the management subsystem as needed; and
   d) a query management process for responding to queries of a user and providing transparent access to said data structures corresponding to networks or sub-networks for graphical display of said data structures to said user.

2. The system of claim 1, wherein the network management system process, optimization process, indexing process and query management process are implemented on one or more separate computing platforms, and wherein the decentralized distributed software and hardware system includes a mechanism for dynamically transferring the network management system process, optimization process, indexing process and query management process from one computing platform to another computing platform.

3. The system of claim 1, wherein the one or more computing platforms comprise distributed computing nodes in the plurality of distributed computing nodes.

4. The system of claim 1, wherein the input records comprise publications or portions thereof.

5. The system of claim 4, wherein the sub-network or network comprises a network selected from the group of networks consisting of a) an undirected network, and b) a directed network.

6. The system of claim 1, wherein the input records include relational data.

7. The system of claim 1, wherein the records comprise relational data and non-relational data, and wherein the network management process includes instructions for directing one of the distributed computing nodes to forward relational data associated with a record to another of the distributed computing nodes for processing.

8. The system of claim 1, wherein the query management process further supports the use of a visualization tool for generating a graphical visualization of the relational data requested by a user.

9. The system of claim 1, wherein the distributed computing nodes generate data structures corresponding to sub-networks, and wherein the query management process merges sub-networks from two or more distributed computing nodes in response to a user query.

10. The system of claim 1, wherein each of the distributed computing nodes includes an indexing process and wherein the output of the indexing process is provided to a computing platform executing the indexing process in the management subsystem.

11. The system of claim 1, wherein the management subsystem further comprises a mechanism for dynamically adding or removing a node to or from the system.

12. A method for distributed generation and storage of data structures corresponding to networks or sub-networks and representing said data structures in a graphical form via an algorithm that supports generation, manipulation and visualization of said graphical form, comprising the steps of:
   receiving a collection of individual input records;
   distributing the records to a plurality of individual, distributed computing nodes;
   at the individual computing nodes, generating said data structures corresponding to networks or sub-networks and storing the data structures corresponding to networks or sub-networks as relational data locally, and
   creating an index of the relational data stored at individual computing nodes to facilitate access to the relational data in response to a query of a user, the data structures capable of being represented in a graphical form via an algorithm that supports generation, manipulation and visualization of said graphical form,
   wherein the relational data corresponding to said data structures for a set of multiple individual input records is generated and stored across a plurality of individual computing nodes; and
   in response to said query providing said data structures to the user for graphical display of the data structures to the user.

13. The method of claim 12, wherein the method further comprises the steps of:
   a) at the individual computing nodes, indexing local record data;
   b) providing local record data indexed at the individual computing nodes to a computing platform executing an indexing process;
   c) validating the indexing of the relational data generated at the individual computing nodes at the computing platform executing the indexing process; and
   d) using the index of the relational data to select relational data to respond to the query from the user.

14. The method of claim 13, wherein the response to the user's query is generated by a query management process accessing indexing data provided by the computing platform executing the indexing process.

15. The method of claim 12, wherein the step of distributing the records to a plurality of individual computing nodes is optimized according to at least one of (a) local computing resources available at the individual computing nodes, (b) pre-existing availability of the records or portions thereof at the individual computing nodes or storage devices accessible thereto, and (c) customizable optimization criteria.

16. The method of claim 15, wherein the customizable optimization criteria include at least one of (i) neighborhood coverage comprising information as to adjacent vertices in a network representation of the relational data and (ii) completeness, comprising relevant information for a given link in the network representation being stored at the same computing node.

17. The method of claim 15, wherein the step of distributing the records to a plurality of individual computing nodes is performed by a network management process executing in a first computing platform, the network management process coordinating distribution of the records to the plurality of individual computing nodes from optimization input from a records distribution optimization process.

18. The method of claim 17, wherein the network management process and the records distribution optimization process are executed on distinct computing platforms.

19. The method of claim 12, wherein the method further comprises the step of transferring at least one of the following processes from one computing platform to another computing platform:
 a) a network management system process for coordinating dispatching records to the distributed computing nodes for processing,
 b) an optimization process for optimizing the dispatch of records to the nodes for processing,
 c) an indexing process of indexing of records dispatched to the nodes and relational data stored at the nodes; and
 d) a query management process for responding to user queries of the distributed computing system and providing transparent access to the relational data.

20. The method of claim 12, wherein, in response to a user query, relational data from two or more individual computing nodes is merged into a merged representation of the relational data.

21. The method of claim 12, wherein the input records comprise publications or portions thereof.

* * * * *

UNITED STATES PATENT AND TRADEMARK OFFICE
CERTIFICATE OF CORRECTION

| | |
|---|---|
| PATENT NO. | : 7,647,335 B1 |
| APPLICATION NO. | : 11/216243 |
| DATED | : January 12, 2010 |
| INVENTOR(S) | : Federico Colecchia |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 383 days.

Signed and Sealed this

Sixteenth Day of November, 2010

David J. Kappos
*Director of the United States Patent and Trademark Office*